US005344808A

United States Patent [19]

Watanabe et al.

[11] Patent Number: 5,344,808

[45] Date of Patent: Sep. 6, 1994

[54] INTERMEDIATE TRANSFER MEDIUM AND PROCESS FOR PRODUCING IMAGE-RECORDED ARTICLE MAKING USE OF THE SAME

[75] Inventors: Niro Watanabe; Tatsuya Morimitsu; Kazuhisa Hoshino; Akihiko Kobayashi; Kiyoshi Horie; Naoaki Shindo; Yoshiaki Tada; Takashi Sato, all of Tokyo, Japan

[73] Assignee: Toppan Printing Co., Ltd., Tokyo, Japan

[21] Appl. No.: 111,468

[22] Filed: Aug. 25, 1993

[30] Foreign Application Priority Data

| | | | |
|---|---|---|---|
| Sep. 9, 1992 | [JP] | Japan | 4-240632 |
| Dec. 21, 1992 | [JP] | Japan | 4-340150 |
| Mar. 19, 1993 | [JP] | Japan | 5-060408 |

[51] Int. Cl.$^5$ ...................... B41M 5/035; B41M 5/38; G02B 5/32

[52] U.S. Cl. .................................... 503/227; 156/235; 156/240; 359/1; 359/3; 428/195; 428/201; 428/203; 428/204; 428/212; 428/913; 428/914; 430/2

[58] Field of Search .................... 8/471; 156/235, 240; 359/1, 3; 428/195, 201, 203, 204, 212, 913, 914; 430/1, 2; 503/227

[56] References Cited

U.S. PATENT DOCUMENTS

| | | | |
|---|---|---|---|
| 5,006,502 | 4/1991 | Fujimura et al. | 503/227 |
| 5,064,807 | 11/1991 | Yoshida et al. | 503/227 |

FOREIGN PATENT DOCUMENTS

| | | | |
|---|---|---|---|
| 62-238791 | 10/1987 | Japan | 503/227 |
| 63-81093 | 4/1988 | Japan | 503/227 |
| 2-153791 | 6/1990 | Japan | 503/227 |
| WO92/04692 | 3/1992 | PCT Int'l Appl. | 428/195 |

*Primary Examiner*—B. Hamilton Hess
*Attorney, Agent, or Firm*—Armstrong, Westerman, Hattori, McLeland & Naughton

[57] ABSTRACT

An intermediate transfer medium comprises a heat-resistant base sheet and provided thereon a release layer and an image-receiving adhesive layer on which an image pattern is formed by a sublimation transfer means in accordance with image data, said image-receiving adhesive layer, on which said image pattern has been formed, being transferred to a transfer substrate together with said release layer to produce an image-recorded article, wherein said image-receiving adhesive layer is comprised of a thermoplastic resin having a glass transition point of 50° C. or above and a filler added to the thermoplastic resin and selected from the group consisting of an inorganic filler having a melting point of 200° C. or above and an organic filler having a softening point or decomposition point of 200° C. or above.

15 Claims, 12 Drawing Sheets

INTERMEDIATE TRANSFER MEDIUM AND PROCESS FOR PRODUCING IMAGE-RECORDED ARTICLE MAKING USE OF THE SAME

BACKGROUND OF THE INVENTION

1. Field of the Invention

This invention relates to an intermediate transfer medium provided with an image-receiving adhesive layer on which an image pattern is formed by a sublimation transfer means in accordance with image data and which is used to produce an image-recorded article such as an identity card (hereinafter "ID card") by transferring the image-receiving adhesive layer to a transfer substrate such as a card material. This invention also relates to a process for producing the image-recorded article.

2. Description of the Prior Art

As known in the art, a process for producing an image-recorded article by forming on an image-receiving adhesive layer of an intermediate transfer medium an image pattern by a sublimation transfer means in accordance with image data and transferring the image-receiving adhesive layer of the intermediate transfer medium to a transfer substrate by thermal transfer has been available (see Japanese Patent Application Laid-open No. 63-81093).

This conventional process will be detailed below. The intermediate transfer medium used in this process is basically comprised of an any desired heat-resistant base sheet and provided on one side thereof at least an image-receiving adhesive layer formed of a thermoplastic resin capable of being dyed with a sublimation (or thermal conversion) dye.

A heat-sublimation ink layer of a transfer ribbon, containing a coloring material comprising a sublimation dye, is brought into contact with the image-receiving adhesive layer of such an intermediate transfer medium, and a thermal head is brought into pressure contact with it from the side of the transfer ribbon, where electrical signals Generated in accordance with image data are applied to the thermal head with heating to cause the dye in the heat-sublimation ink layer to imagewise transfer to the image-receiving adhesive layer to form an image pattern on that layer. In the case when the image data represent multiple colors, transfer ribbons with different colors are applied and a like process is repeated necessary times to form a multi-color image pattern on the image-receiving adhesive layer of the intermediate transfer medium.

Next, the intermediate transfer medium on which the image pattern has been formed through the above process is brought into contact with the surface of a transfer substrate, and a heating medium such as a heat roll or a heat plate is pressed against it from the side of the intermediate transfer medium to carry out heating so that at least the image-receiving adhesive layer of the intermediate transfer medium is thermally transferred to the transfer substrate. Thus, an image-recorded article such as an ID card is produced. Here, the image-receiving adhesive layer is comprised of a thermoplastic resin and serves also as an adhesive.

This process has the advantages that the image pattern is formed of a sublimation dye and can be sharp, and the image can be formed without any particular limitations on the type of the transfer substrate.

However, in carrying out the above process, it comes into question what material should be selected for the image-receiving adhesive layer in the intermediate transfer medium. More specifically, in the step of forming the image pattern the layer is heated while it is in contact with the transfer ribbon, and hence there is a possibility that the image-receiving adhesive layer is transferred or thermally melt-adheres to the transfer ribbon side when the thermoplastic resin constituting the image-receiving adhesive layer has a low heat-melting temperature. In order to prevent this unauthorized transfer, one may contemplate to use in the image-receiving adhesive layer a thermoplastic resin having a higher heat-melting temperature. This, however, makes it necessary to raise the temperature of the heating medium in the step of transferring the image-receiving adhesive layer to the transfer substrate, so that the image pattern comprised of a dye may deteriorate or fade and also a damage due to heat may be caused in the transfer substrate. Meanwhile, in order to decrease the adhesion to the transfer ribbon, one may also contemplate to mix an additive such as silicon in the image-receiving adhesive layer. In such a case, however, a problem may arise such that the adhesion to the transfer substrate becomes poor.

The image-recorded article produced by this process has an image pattern and accordingly can be used in ID cards such as membership cards. Since, however, no attention has been paid to the prevention of forgery or falsification of the image pattern, and there is the problem that the image pattern tends to be forged or falsified.

SUMMARY OF THE INVENTION

The present invention was made taking note of such problems. Accordingly, an object of the present invention is to provide an intermediate transfer medium used to produce an image-recorded article that may undergo less deterioration or fading, or damage due to heat, of the image pattern formed using a sublimation dye.

Another object of the present invention is to provide an intermediate transfer medium used to produce an image-recorded article whose image pattern is hard to forge or falsify.

Still another object of the present invention is to provide an intermediate transfer medium used to produce an image-recorded article that enables easy detection of any forgery or falsification even when the image pattern has been forged or falsified.

A further object of the present invention is to provide a process for producing an image-recorded article that may undergo less deterioration or fading, or damage due to heat, of the image pattern formed using a sublimation dye, and whose image pattern is hard to forge or falsify.

The present invention provides an intermediate transfer medium comprising a heat-resistant base sheet and provided thereon a release layer and an image-receiving adhesive layer on which an image pattern is formed by a sublimation transfer means in accordance with image data, said image-receiving adhesive layer, on which said image pattern has been formed, being transferred to a transfer substrate together with said release layer to produce an image-recorded article, wherein;

said image-receiving adhesive layer is comprised of a thermoplastic resin having a glass transition point of 50° C. or above and a filler added to the thermoplastic resin and selected from the group consisting of an inorganic filler having a melting point of 200° C. or above and an organic filler having a softening point or decomposition point of 200° C. or above.

Between the release layer and the image-receiving adhesive layer, a hologram forming layer having a land-and-groove pattern that constitutes a white-light reproduction type hologram and a transparent thin-film layer having a larger refractive index than the hologram forming layer may be further provided in this order from the release layer side.

The present invention also provides a process for producing an image-recorded article, comprising the steps of;

forming on an image-receiving adhesive layer of an intermediate transfer medium a multi-level image pattern formed of a sublimation ink and a binary image pattern formed of a coloring heat-melting ink and feasible for optical machine reading, by means of a thermal head by the use of a transfer ribbon alternately repeatedly provided with heat-sublimation ink layers and coloring heat-melting ink layers; said intermediate transfer medium comprising a heat-resistant base sheet and provided thereon i) a release layer and ii) an image-receiving adhesive layer comprised of a thermoplastic resin having a glass transition point of 50° C. or above and a filler added to the thermoplastic resin and selected from an inorganic filler having a melting point of 200° C. or above and an organic filler having a softening point or decomposition point of 200° C. or above; and thermally transferring to a transfer substrate the image-receiving adhesive layer on which each image pattern has been formed, together with the release layer.

Between the release layer and the image-receiving adhesive layer of the intermediate transfer medium used in the above process, a hologram forming layer and a transparent thin-film layer may be further provided in this order from the release layer side.

DESCRIPTION OF THE PREFERRED EMBODIMENTS

The present invention will be described below in detail.

In the present invention, the intermediate transfer medium comprises a heat-resistant base sheet and provided thereon a release layer and an image-receiving adhesive layer on which an image pattern is formed by a sublimation transfer means in accordance with image data, where the image-receiving adhesive layer, on which the image pattern has been formed, is transferred to a transfer substrate together with the release layer to produce an image-recorded article; and is characterized in that the image-receiving adhesive layer is comprised of a thermoplastic resin having a glass transition point (Tg) of 50° C. or above and an inorganic filler having a melting point of 200° C. or above or an organic filler having a softening point or decomposition point of 200° C. or above.

According to this intermediate transfer medium, the inorganic filler having a melting point of 200° C. or above or the organic filler having a softening point or decomposition point of 200° C. or above is added in the image-receiving adhesive layer. Hence, there is no possibility that the image-receiving adhesive layer is transferred to the transfer ribbon side in the step of forming the image pattern even when the thermoplastic resin constituting the image-receiving adhesive layer has a low heat-melting temperature, and also, since the additive such as silicon need not be used, the layer can have an improved adhesion to the transfer substrate. In addition, the thermoplastic resin constituting the image-receiving adhesive layer has a glass transition point of 50° C. or above, and hence the image may by no means undergo any change due to heat.

In another embodiment of the intermediate transfer medium according to the present invention, between the release layer and the image-receiving adhesive layer, a hologram forming layer having a land-and-groove pattern that constitutes a white-light reproduction type hologram and a transparent thin-film layer having a larger refractive index than the hologram forming layer may be further provided in this order from the release layer side.

In the case of an image-recorded article produced using the intermediate transfer medium having such a structure, a transparent hologram pattern is formed on the image pattern comprised of a sublimation dye, and hence it becomes difficult to forge or falsify the image pattern without eliminating the hologram pattern.

Figure 1:
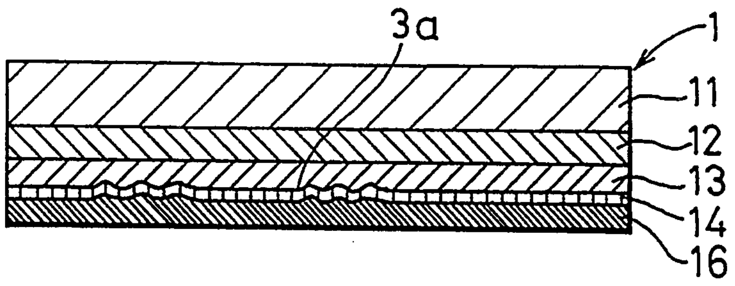
FIG. 1 is a cross-sectional illustration of an intermediate transfer medium according to Example 1.
Figure 2:
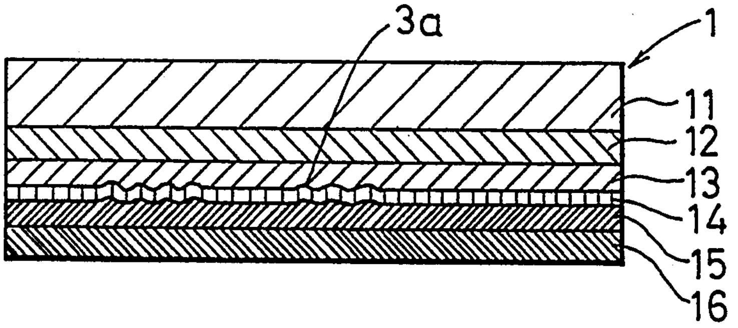
FIG. 2 is a cross-sectional illustration of an intermediate transfer medium according to Example 3.

The intermediate transfer medium according to the present invention will be described below in detail, taking as an example the intermediate transfer medium further provided with the hologram forming layer and the transparent thin-film layer. This intermediate transfer medium is mainly comprised of, as shown in FIG. 1, a base film 11, a release layer 12, a hologram forming layer 13, a transparent thin-film layer 14 and an image-receiving adhesive layer 16. In the hologram forming layer 13, land-and-groove pattern 38 that constitutes a white-light reproduction type hologram is formed. As shown in FIG. 2, a primer layer 15 may also be provided between the transparent thin-film layer 14 and the image-receiving adhesive layer 16.

The base film 11 is required to have a heat resistance high enough not to be softened and deformed by heat and pressure applied during transfer. As the base film 11, it is possible to use, for example, a biaxially oriented polyethylene terephthalate film with a thickness of from 3 to 50 μm. It is also possible to use a biaxially oriented film comprising a polyethylene naphthalate represented by the formula:

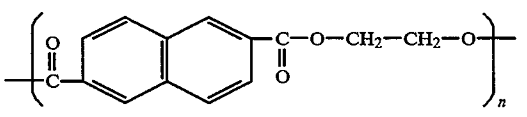

(n = 60 to 110)

The latter polyethylene naphthalate film has a smaller heat-shrinkage factor than other films and has a superior thermal stability, so that it becomes possible to prevent a stress from being produced in the base sheet when the image pattern is formed in the image-receiving adhesive layer by sublimation transfer. Thus , the polyethylene naphthalate film can bring about the advantages that the image pattern of the image-receiving adhesive layer transferred to the transfer substrate does not easily deteriorate and, in the intermediate transfer medium provided with the hologram forming layer and the transparent thin-film layer, any "faulty whitening" due to cracks produced in the transparent thin-film layer can be prevented.

Because of the superior thermal stability, the polyethylene naphthalate film enables use of a base sheet with a smaller thickness. Thus, because of an improvement in thermal conductivity that corresponds to the decrease in the thickness of the base sheet, this film also has the advantages that it becomes possible to make the image-receiving adhesive layer firmly heat-adhere to the transfer substrate and also becomes possible to set small the diameter of a roll around which the intermediate transfer medium is wound up.

For the purpose of preventing the heat-resistant base sheet (the base film 11) and the image-receiving adhesive layer from blocking each other when the intermediate transfer medium obtained is wound up for its storage, a back coat layer may also be provided on the back surface of the heat-resistant base sheet. Such a back coat layer can be exemplified by a layer comprising nitrocellulose incorporated with silicone oil, a layer comprising polyester resin incorporated with silicone oil, and a layer comprising polyester or acrylic resin grafted with silicone resin. For the purpose of improving heat resistance, a cross-linking agent may also be used in combination. To form this back coat layer, first a back coat layer composition may be made into a coating material by the use of a suitable solvent, and then the resulting coating material may be applied by a coating process such as gravure coating, roll coating or bar coating, followed by drying. It may preferably be applied in a coating weight of from 0.3 to 2 μm.

Next, the release layer 12 provided on the heat-resistant base sheet 11 is required to be readily pealable from the base film 11 when transferred to the transfer substrate, and also is required to function as a protective film of the image-recorded article after transfer. The function as a protective film is a function of preventing any external chemical and mechanical damage of the image pattern comprised of a dye. In order to achieve both the functions, a mixture of a thermoplastic resin with an anti-abrasion agent may be used in the release layer.

The above thermoplastic resin prevents penetration of plasticizers or chemicals and at the same time decreases scratches. As the thermoplastic resin, it is possible to use, for example, polymethyl methacrylate or epoxy resins. The polymethyl methacrylate and the epoxy resins have a superior resistance to plasticizers among existing thermoplastic resins and also enables easy release from the base sheet 11. Use of any of these resins in the release layer 12 makes it possible to prevent transfer of plasticizers contained in a soft vinyl chloride sheet or a plastic eraser when such sheet and eraser are brought into touch with the image-recorded article produced. Their use also makes it possible to prevent penetration of chemicals such as acid, alkali, alcohol and karosine and to prevent an influence on the image pattern. Meanwhile, the anti-abrasion agent is added in order to improve wear resistance and scratch resistance of the release layer, and may include, for example, Teflon powder, polyethylene powder, natural waxes such as animal waxes, vegetable waxes, mineral waxes and petroleum waxes, synthetic waxes such as synthetic hydrocarbon waxes, aliphatic alcohol-acid waxes, fatty acid ester-glyceride waxes, hydrogenated wax, synthetic ketone waxes, amine-amide waxes, chlorinated hydrocarbon waxes, synthetic animal waxes and α-olefin waxes, and metal salts of higher aliphatic acids such as zinc stearate.

The thermoplastic resin and the anti-abrasion agent that constitute the release layer 12 may be mixed in a proportion of, for example, from 85 to 95 parts by weight for the thermoplastic resin and from 5 to 15 parts by weight for the anti-abrasion agent, based on 100 parts by weight of the total weight of the thermoplastic resin and anti-abrasion agent. The release layer 12 may be in a coating weight of, for example, from 1 to 3 $g/m^2$.

The release layer 12 may also be incorporated with a release improver comprised of, for example, a linear saturated polyester resin so that the release sharpness at the time of transfer can be improved. Here, it should be incorporated in an amount limited to from 0 to 3 parts by weight based on the total weight of the thermoplastic resin and anti-abrasion agent.

Other additives as exemplified by an ultraviolet absorbent should not be added to the release layer 12. This is because such addition may cause a lowering of resistance to chemicals, or a deterioration of mechanical strength because of easy penetration of plasticizers. To form the release layer 12, first a release layer composition may be made into a coating material by the use of a suitable solvent, and then the resulting coating material may be applied by a coating process such as gravure coating, roll coating or bar coating, followed by drying.

The hologram forming layer 13 is a layer in which the land-and-groove pattern 3*a* that constitutes a white-light reproduction type hologram is formed by heat and pressure applied using a surface relief hologram stamper. As a resin used in this hologram forming layer 13, a two-part reactive urethane resin may be used. This brings about very good results. More specifically, the two-part reactive urethane resin has a good emboss moldability, does not easily cause press uneveness, can provide a bright hologram reproduced image, and also has a good adhesion to the transparent thin-film layer 14 described above. From the viewpoint of properties such as solvent resistance, heat resistance and processability, such a two-part reactive urethane resin may suitably include polyol curable urethane resins comprised of a polyol component such as a polyether polyol, a polyester polyol or an acrylic polyol and a prepolymer having an isocyanate group. In particular, use of an acrylic polyol resin having a polyol component with a glass transition point in the range of from 70° to 105° C. and having OH groups in the range of from 50 to 150 groups as an OH value makes it possible to obtain a good intermediate transfer medium that can enjoy a good coating adaptability and has a very good emboss moldability required in the intermediate transfer medium and a very good releasability from the heat-resistant base sheet. As the isocyanate component, toluenediisocyanate (TDI), xylenediisocyanate (XDI), hexamethlenediisocyanate (HMDI) and so forth may be used.

As a modifier for improving coating adaptability and transfer performance, a cellulose resin such as nitrocellulose, acetyl cellulose, cellulose acetate burylate, cellulose acetate propionate, ethyl cellulose or methyl cellulose may also be added in an amount of 30% by weight at maximum based on the weight of the two-part reactive urethane resin.

To form such a hologram forming layer 13, a resin made into a coating material may be coated by a process such as roll coating or blade coating, followed by drying. Its thickness may be set to from about 0.5 to about 5 μm.

The hologram forming layer 13 thus obtained can appropriately adhere to the heat-resistant base sheet provided with the release layer 12, and also can have an excellent moldability conformable to heat and pressure applied when embossing is carried out. At the same time, it exhibits no adhesion to a surface relief hologram stamper whose surface has been coated with nickel, gold, chromium or the like, and yet exhibits a good adhesion to the transparent thin-film layer 14, also having a good film-release sharpness required at the time of transfer. It also enables sure transfer that can be free from any faulty release of the transparent thin-film layer 14 at the time of transfer to the transfer substrate or from any occurrence of transfer non-uniformity, flashes and blisters, and, because of an excellent heat resistance of the urethane resin, enables prevention of a lowering of appearance quality such as cracks, whitening, break of the land-and-groove pattern, due to a shrinkage caused by the heat in the step of vacuum deposition or at the time of transfer.

As materials for constituting the transparent thin-film layer 14, materials having a higher refractive index and a higher transmittance in the visible light region than the hologram forming layer 13 are used. When a transparent thin-film layer 14 having a higher refractive index is provided along the land-and-groove pattern surface of the hologram forming layer 13, the reflectance of light in the transparent thin-film layer 14 becomes maximum within the range of angles at which a hologram image can be reproduced, because of the dependence of reproduction on angles that is a feature of holograms, so that the layer functions as a "reflection type hologram". On the other hand, in the outside of the range of angles at which a hologram image can be reproduced, the layer functions as a mere transparent member to make it possible to see through it the image pattern positioned on the side of the transfer substrate of the image-recorded article.

Materials for constituting such a transparent thin-film layer can be exemplified by inorganic materials shown in Table 1 below.

TABLE 1

| Materials | Refractive index (n) | Materials | Refractive index (n) |
|---|---|---|---|
| $Sb_2O_3$ | 3.0 | SiO | 2.0 |
| $Fe_2O_3$ | 2.7 | $Si_2O_3$ | 2.5 |
| $TiO_2$ | 2.6 | $In_2O_3$ | 2.0 |
| CdS | 2.6 | PbO | 2.6 |
| $CeO_2$ | 2.3 | $Ta_2O_3$ | 2.4 |
| ZnS | 2.3 | ZnO | 2.1 |
| $PbCl_2$ | 2.3 | $ZrO_2$ | 2.0 |
| CdO | 2.2 | $Cd_2O_3$ | 1.8 |
| $Sb_2O_3$ | 2.0 | $Al_2O_3$ | 1.6 |
| $WO_3$ | 2.0 | | |

The transparent thin-film layer 14 may be formed by using a film forming means such as vacuum deposition, sputtering or ion plating. It is suitable for the layer to have a thickness ranging, for example, from 100 angstroms to 10,000 angstroms.

The primer layer 15 shown in FIG. 2 is an adhesion improving layer that secures adhesion between the transparent thin-film layer 14 and the image-receiving adhesive layer 16. Resins used therefor can be exemplified by polyurethane ionomer resins, polyester resins or urethane resins, and materials comprised of a polyol component such as a polyether polyol, a polyester polyol or a acrylic polyol and a prepolymer having an isocyanate group, as well as epoxy resins, in particular, bisphenol type epoxy resins or novolac type epoxy resins. To form this primer layer 15, first a primer layer composition may be made into a coating material by the use of a suitable solvent, and then the resulting coating material may be applied by a coating process such as gravure coating, roll coating or bar coating, followed by drying.

The image-receiving adhesive layer 16 is a layer on which the image pattern is formed by a sublimation transfer means in accordance with image data and which is brought into contact with the surface of the transfer substrate formed of a plastic material. This layer is mainly composed of a thermoplastic resin having a glass transition point of 50° C. or above and a filler described below. This is because the sole use of the thermoplastic resin having a glass transition point of 50° C. or above may cause a migration of dyes on account of this resin to blur the image pattern.

The upper limit of the glass transition point of the above thermoplastic resin may preferably be 150° C. That is, the thermoplastic resin used in the image-receiving adhesive layer may preferably be those having a glass transition point of from 50° C. to 150° C., and preferably from 50° C. to 110° C.. Use of a thermoplastic resin having a glass transition point of higher than 150° C. may require a higher temperature at the time of transfer, sometimes resulting in not only an excessive load applied to a heating means such as a thermal head but also a deformation due to heat, of a transfer substrate such as a polyvinyl chloride card.

The thermoplastic resin usable in the this image-receiving adhesive layer 16 may include, for example, polyesters such as linear saturated polyesters; polyvinyl chloride resins such as polyvinyl chloride and vinyl chloride/vinyl acetate copolymer resins; acrylic resins such as polyacrylic acid, poly-2-methoxyethyl acrylate, polymethyl acrylate, poly-2-naphthyl acrylate, polyisobornyl acrylate, polymethacylomethyl, polyacylonitrile, polymethyl chloroacrylate, polymethyl methacrylate, polyethyl methacrylate, poly-tert-butyl methacrylate, polyisobutyl methacrylate, polyphenyl methacrylate, and methyl methacrylate/alkyl methacrylate copolymer resins (whose alkyl group has 2 to 6 carbon atoms); and vinyl resins such as polystyrene, polydivinylbenzene, polyvinylbenzene, styrene/butadiene copolymer resins, and styrene/alkyl methacrylate copolymer resins (whose alkyl group has 1 to 6 carbon atoms).

A thermoplastic resin having a glass transition point of lower than 50° C. may also be used so long as it is used in combination with the thermoplastic resin having a glass transition point of 50° C. or above. Such constitution can bring about the advantages that the density of the image pattern formed in the image-receiving adhesive layer 16 can be improved and also the adhesion to the transfer substrate can be improved. The thermoplastic resin having a glass transition point lower than 50° C. can be exemplified by polyester resins, polyurethane resins and methacrylic resins.

Here, when the sublimation transfer image is transferred to the surface of the image-receiving adhesive layer 16 by means of a thermal head through a transfer ribbon, if the image-receiving adhesive layer 16 is mainly composed of only the thermoplastic resin, the image-receiving adhesive layer 16 may thermally melt-adhere to a heat-sublimation ink layer of the transfer ribbon on account of the heat of the thermal head unless no countermeasure is taken, so that no clean image pattern can be obtained. Accordingly, an inorganic filler having a melting point of 200° C. or above or an organic filler having a softening point or decomposition point of 200° C. or above, having anti-blocking properties, is added in the image-receiving adhesive layer 16 to prevent the thermal melt-adhesion. For example, the organic filler may include fine polytetrafluoroethylene particles, starch, fine silicone resin particles, fine polyacrylonitrile particles, fine cured resin particles made from benzoguanamine resin and melamine resin. The inorganic filler may include calcium carbonate, talc, caolin, zinc oxide, titanium oxide, silicon oxide, aluminum hydroxide, barium sulfate and magnesium oxide.

There are no particular limitations on the upper limit of the melting point of the inorganic filler or the softening point or decomposition point of the organic filler. The object of the present invention can be achieved so long as the filler does not melt, soften or decompose during the transfer process. The upper limit thereof can be said to be the melting point, softening point or decomposition point inherent in any fillers available in the art or in the natural world.

There are also no particular limitations on the particle size of the inorganic or organic filler. In usual instances, the filler may be those having an average particle diameter of from 0.01 $\mu m$ to 10 $\mu m$, and preferably from 0.1 $\mu m$ to 5.0 $\mu m$.

The thermoplastic resin and the filler may be mixed in such a proportion that, for example, the filler is in an amount ranging from 1 part to 50 parts by weight based on 100 parts by weight of the thermoplastic resin (including the thermoplastic resin having a glass transition point of lower than 50° C. that when used in combination). To form the image-receiving adhesive layer, first a image-receiving adhesive layer composition may be made into a coating material by the use of a suitable solvent, and then the resulting coating material may be applied by a coating process such as gravure coating, roll coating or bar coating, followed by drying. The layer may be in a coating weight set to, for example, from about 1 to about 10 $g/m^2$.

In order to prevent dyes that form the image pattern from being faded on account of light, an ultraviolet absorbent with a maximum absorption wavelength of from 250 to 400 nm may be added to the image-receiving adhesive layer. That is, this ultraviolet absorbent absorbs ultraviolet rays of from 250 to 400 nm in wavelength, and again radiates the absorbed energy after its conversion into a thermal energy harmless to the dyes, where the ultraviolet absorbent itself undergoes no change in properties at all. Such an ultraviolet absorbent may include, for example, salicylic acid type ultraviolet absorbents such as phenyl salicylate, p-tert-butylphenyl salicylate and p-octylphenyl salicylate; benzophenone type ultraviolet absorbents such as 2,4-dihydroxybenzophenone, 2-hydroxybenzophenone, 2-hydroxy-4-octoxybenzophenone, 2-hydroxy-4-dodecyloxybenzophenone, 2,2'-dihydroxy 2,2'-dihydroxy-4,4'-dimethoxybenzophenone and 2-hydroxy-4-methoxy-5-sulfobenzophenone; benzotriazole type ultraviolet absorbents such as 2-(2'-hydroxy-5'methylphenyl)benzotriazole, 2-(2'-hydroxy-5'-tertbutylphenyl)benzotriazole, 2-(2'-hydroxy-3'-tert-butyl-5'methylphenyl)benzotriazole, 2-(2'-hydroxy-3',5'-di-tert-butylphenyl)-5-chlorobenzotriazole and 2-(2'-hydroxy-3',5'-di-tert-amylphenyl) benzotriazole; and cyanoacrylate type ultraviolet absorbents such as 2-ethylhexyl-2-cyano-3,3'-diphenylacrylate and ethyl-2-cyano-3,3-diphenylacrylate.

The ultraviolet absorbent may be mixed in a proportion of, for example, from 5 to 40 parts by weight based on 100 parts by weight of a mixture comprised of the thermoplastic resin and the filler.

On the image-receiving adhesive layer 16 of the intermediate transfer medium 1 thus obtained, the image pattern comprised of a sublimation dye is formed, and then the resulting intermediate transfer medium is superposed on the transfer substrate, followed by application of heat and pressure, so that the image-receiving adhesive layer 16 is transferred to the transfer substrate together with the transparent thin-film layer 14, the hologram forming layer 13 and the release layer 12 except the heat-resistant base sheet 11 removed at the final stage of the transfer. The transfer to the transfer substrate may be carried out under heating to a temperature not lower than the softening point of the thermoplastic resin contained in the image-receiving adhesive layer 16. A heater used therefor may be set usually at 150° to 250° C. The heating may preferably be carried out for 10 seconds or less from the viewpoint of preventing the transfer substrate from warping as a result of heating.

The sublimation dye used may include those conventionally used in the present technical field. Examples thereof are disclosed, for example, in U.S. Pat. No. 5,064,807.

Figure 3:
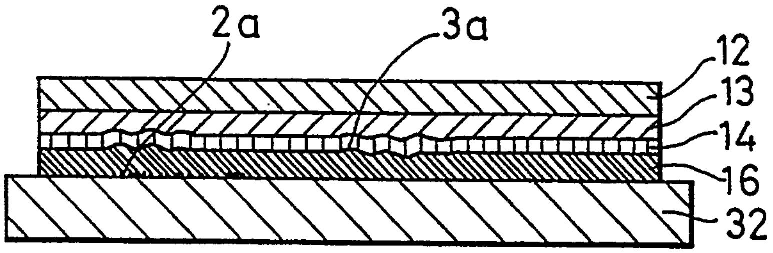
FIG. 3 is a cross-sectional illustration of the intermediate transfer medium according to Example 1 having been transferred to a transfer substrate.
Figure 4:
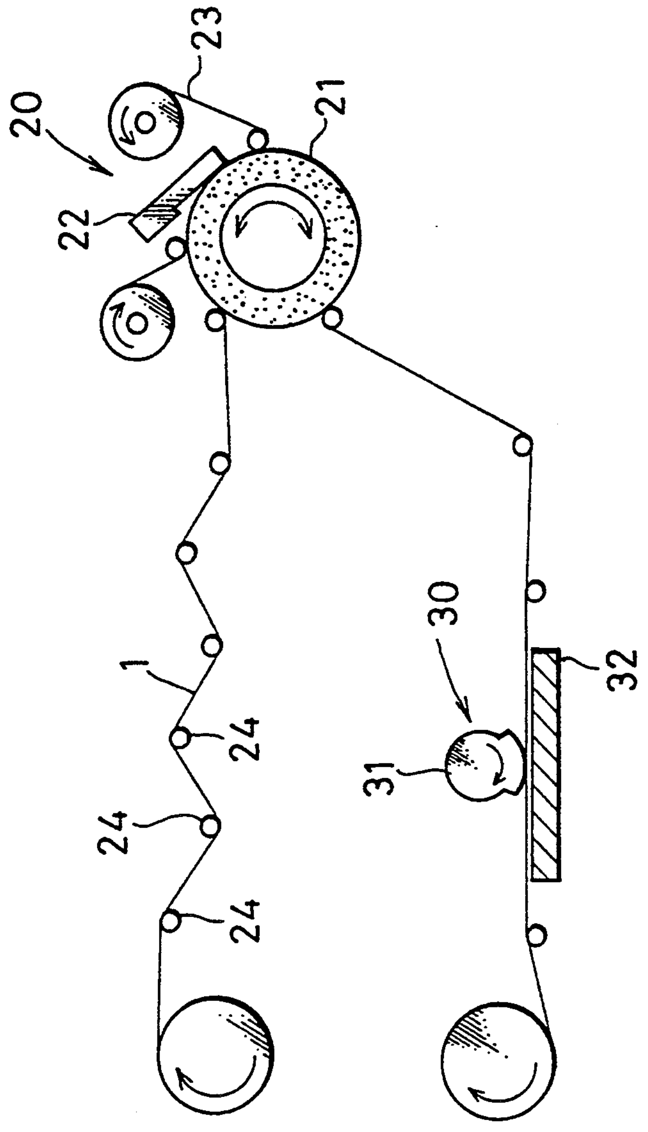
FIG. 4 illustrates an apparatus for producing an image-recorded article by using the intermediate transfer medium according to an example of the present invention.

FIGS. 3 and 4 show an example in which the intermediate transfer medium 1 shown in FIG. 1 is transferred to an ID card material (the transfer substrate) comprised of a plastic material to produce an image-recorded article.

As shown in FIG. 4, the intermediate transfer medium 1 is wound around a roll shown at the upper left in the drawing, and delivered to a sublimation image transfer zone 20 and a transfer zone 30 through a plurality of delivery rollers 24. In the drawing, the image-receiving adhesive layer of the intermediate transfer medium is formed on the upper side thereof.

The sublimation image transfer zone 20 comprises a drum 21 with which the intermediate transfer medium 1 comes into sliding contact, a transfer ribbon 23 whose colorant is a sublimation dye, and a thermal head 22 brought into pressure contact with the drum from the transfer ribbon 23 side. In the formation of the image pattern, electrical signals generated in accordance with image data are applied to the thermal head 22 to carry out heating, so that the dyes in the heat-sublimation ink layer is imagewise transferred to the image-receiving adhesive layer to form the image pattern *2a* as shown in FIG. 3. In the case when the image data represent multiple colors, a single-base transfer ribbon having heat-sublimation ink layers with different colors may be used to from a multi-color image pattern, or a plurality combinations of transfer ribbons with different colors and thermal heads 22 may be provided along the drum so that a multi-color image pattern can be formed.

The transfer zone 30 has a heat roll 31 with which the intermediate transfer medium 1 on the transfer substrate 32 is heated from the back surface thereof (the heat-resistant base sheet side). The release layer 12 and its underlying layers of the intermediate transfer medium 1 heated with the heat roll 31 are transferred to the transfer substrate 32 to constitute part of the image-recorded article. More specifically, as shown in FIG. 3, the release layer 12 and its underlying layers having been transferred and the transfer substrate, except the heat-resistant base sheet 11 removed at the final stage of the transfer, constitute the image-recorded article.

The transfer substrate 32 need not be limited to the card substate made of plastic, and of course a booklet such as a passport may also be used as the transfer substrate.

In the intermediate transfer medium according to the present invention, a lathe work printed layer 150 may be provided between the release layer 12 and the image-receiving adhesive layer 16. This also makes it possible to prevent the image pattern from being forged or falsified. More specifically, it follows that, also in the image-recorded article produced using such an intermediate transfer medium, the lathe work printed layer 150 is formed on the image pattern comprised of a sublimation dye (see FIG. 7), and hence it is difficult to forge or falsify the image pattern without elimination of the lathe work printed layer 150.

The lathe work printed layer 150 can be readily provided by printing such as offset printing or gravure printing, between the stated layers when the intermediate transfer medium is prepared. Here, lathe works should preferably have rather quiet pale colors since they must not be an obstacle to visual recognition of image patterns such as portrait photographs. It is common for the lathe works to have the form of a pattern formed of minutely and regularly repeated line figures, or a pattern formed of the like pattern with which card-issuer's logotypes, trademarks or the like are combined. In order to more effectively prevent forgery or falsification, special inks as exemplified by fluorescent ink, infrared ray absorbing ink or magnetic ink may be used when the lathe works are printed.

Figure 6:
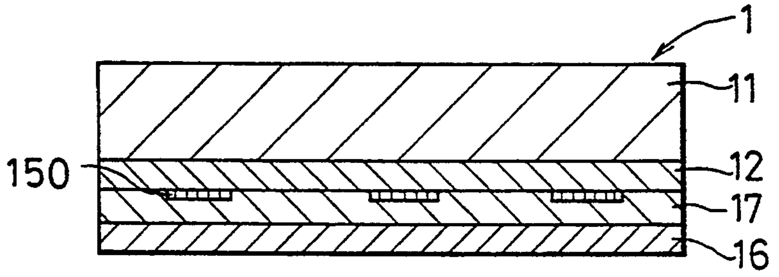
FIG. 6 is a cross-sectional illustration of an intermediate transfer medium according to Example

As shown in FIG. 6, a diffusion preventive layer 17 may also be provided between the release layer 12 and the image-receiving adhesive layer 16. More specifically, this diffusion preventive layer 17 is a layer provided on the image-receiving adhesive layer 16, and is optionally provided so that the image pattern comprised of a sublimation dye can be prevented from diffusing to the outside. In order to prevent the diffusion of the sublimation dye, for example, a natural polymer such as cellulose or a hydrophilic polymer obtained by modifying the natural polymer may be used, preferably including nitrocellulose taking account of adhesion to usual thermoplastic resins, heat resistance and water resistance. It is also possible to use resins having a urethane bond, or epoxy resins. Absence of this diffusion preventive layer 17 may cause diffusion of dyes up to the release layer 12 through the image-receiving adhesive layer 16 when the image-recorded article is left to stand for a long period of time. When the image-recorded article is kept in touch with an eraser, soft vinyl chloride resin or the like containing plasticizers, the dyes may diffuse and transfer to the eraser or soft vinyl chloride resin to cause fading of the image pattern. This diffusion preventive layer IT does not play role as the image-receiving adhesive layer 16. The reason therefor is that the nitrocellulose that constitutes the diffusion preventive layer has a heat resistance and hence does not adhere to the transfer substrate at the time of the thermal transfer to the transfer substrate.

This diffusion preventive layer 17 is comprised of a hydrophilic polymeric simple substance such as nitrocellulose as stated above, and may be in a coating weight of from about 0.5 to about 1.5 $g/m^2$. To form this diffusion preventive layer IT, first a diffusion preventive layer composition may be made into a coating material by the use of a suitable solvent, and then the resulting coating material may be applied by a coating process such as gravure coating, roll coating or bar coating, followed by drying.

The lathe work printed layer 150 may be of course provided in the intermediate transfer medium having the hologram forming layer and the transparent thin-film layer. In such an instance, it may be provided anywhere between the release layer and the hologram forming layer, between the hologram forming layer and the transparent thin-film layer or between the transparent thin-film layer and the image-receiving adhesive layer.

An information pattern printed layer having the same function as the lathe work printed layer 150 and feasible for optical machine reading may also be provided at the same location where the lathe work printed layer 150 is formed. More specifically, this information pattern printed layer is a printed layer containing an infrared ray absorbing substance, and formed by printing into any desired patterns such as bar codes, binary codes, letters, numerals and figures, using an infrared ray absorbing ink mainly composed of the infrared ray absorbing substance, a binder resin such as a vinyl chloride/vinyl acetate copolymer resin, a saturated polyester or a polyurethane elastomer, and a solvent such as toluene, methyl isobutyl ketone, xylene, cyclohexanol, isobutyl acetate, cyclohexanone, methyl cyclohexanone or a glycol derivative including ethylene glycol monobutyl ether or a mixed solvent of any of these. The infrared ray absorbing substance can be exemplified by glass materials such as phosphate glass and sulfate glass obtained by pulverizing infrared ray absorbing glass or radiation ray absorbing glass having less absorption in the visible region to form it into a pigment.

Stated more specifically, a finely divided material mainly composed of phosphorus pentoxide ($P_2O_5$) and containing 1.0% by weight or more of iron oxide and/or copper oxide, and more preferably a finely divided glass material containing 35.0 to 80.0% by weight of phosphorus pentoxide and 0 to 3.0% by weight each of ion oxide and copper oxide. This finely divided glass material may optionally contain the following compound.

| | |
|---|---|
| $Al_2O_3$ | 2.0 to 10.0% by weight |
| $B_2O_3$ | 1.0 to 30.0% by weight |
| MgO | 3.0 to 10.0% by weight |
| ZnO | 0 to 3.0% by weight |
| $K_2O$ | 0 to 15.0% by weight |
| BaO | 0 to 10.0% by weight |
| SrO | 0 to 1.0% by weight |
| Ni, Co, Se | trace amounts |

A white crystalline material such as phosphate type white crystalline powder having less absorption in the visible region and also better infrared absorptive power than the above finely divided glass material may also be used as the infrared ray absorbing substance- Use of such a material is advantageous in that the proportion of the infrared ray absorbing substance dispersed in the infrared ray absorbing ink that constitutes the information pattern printed layer can be decreased because of its superior infrared absorptive power and also, when the transfer substrate has a white color, it can be made difficult for the information pattern printed layer to be visible to the naked eye.

The phosphate type white crystalline powder is a crystalline powder containing 20% by weight or more of $Fe^{2+}$ and/or $Cu^{2+}$ and manly composed of phosphorus pentoxide ($P_2O_5$), and preferably a crystalline powder containing 40 to 70% by weight of phosphorus pentoxide ($P_2O_5$) and 30 to 70% by weight each of $Fe^{2+}$ and/or $Cu^{2+}$. This phosphate type white crystalline powder may also optionally contain the following compound.

| | |
|---|---|
| $Al_2O_3$ | 2.0 to 10.0% by weight |
| $B_2O_3$ | 1.0 to 30.0% by weight |
| MgO | 3.0 to 10.0% by weight |
| ZnO | 0 to 3.0% by weight |
| $K_2O$ | 0 to 15.0% by weight |
| BaO | 0 to 10.0% by weight |
| SrO | 0 to 1.0% by weight |
| Ni, Co, Se | trace amounts |

The infrared ray absorbing substance described above has a white color or pale color and hence suited for the purpose in which white-colored or pale-colored transfer substrates are used. In the case when it is used in transfer substrates required to have other colors, it is also possible to use an infrared absorptive dye of a cyanine type, a phthalocyanine type, a dithiol metal complex type, a naphthoquinone type, an anthraquinone type, a triphenylmethane type, an aminium type or a diimonium type, having a light absorption also in the visible region.

Here, since the lathe work printed layer or the information pattern printed layer is provided, e.g., between the release layer and the image-receiving adhesive layer or between the release layer and the hologram forming layer as described above, it must be formed by gravure printing or the like means in the course of the preparation of the intermediate transfer medium. However, the lathe work printed layer or the information pattern printed layer may also be formed on the image-receiving adhesive layer of an intermediate transfer medium completed, by a heating means such as a thermal head at the same time when the image pattern is formed. It is also possible to use this intermediate transfer medium to produce an image-recorded article that is hard to forge or falsify.

More specifically, on the image-receiving adhesive layer of the intermediate transfer medium comprising the heat-resistant base sheet and provided thereon i) the release layer and ii) the image-receiving adhesive layer comprised of the thermoplastic resin having a glass transition point of 50° C. or above and the filler added to the thermoplastic resin and selected from the inorganic filler having a melting point of 200° C. or above and the organic filler having a softening point or decomposition point of 200° C. or above, a multi-level (or gradational) image pattern formed of a sublimation ink and a binary image pattern formed of a coloring heat-melting ink and feasible for optical machine reading may be formed by means of a thermal head by the use of a transfer ribbon alternately repeatedly provided with heat-sublimation ink layers and coloring heat-melting ink layers, and also the image-receiving adhesive layer on which each image pattern has been formed may be thermally transferred together with the release layer to the transfer substrate. Thus, an image-recorded article that is hard to forge or falsify can be produced.

In place of the intermediate transfer medium comprising the heat-resistant base sheet and provided thereon the image-receiving adhesive layer and the release layer, the intermediate transfer medium further provided with the hologram forming layer and the transparent thin-film layer may be used, whereby an image-recorded article with the like function can be produced as a matter of course.

When an infrared ray absorbing substance of the same color type as the transfer substrate is contained in the coloring heat-melting ink that constitutes the binary image pattern, there is the advantageous that it can be made difficult for the binary image pattern to be visible to the naked eye.

In place of the structure in which the lathe work printed layer or the information pattern printed layer or in addition to such printed layers, a diffraction Orating area feasible for optical machine reading may be provided at some part of the hologram forming layer 13 provided with a land-and-groove pattern that constitutes a white-light reproduction type hologram. More specifically, this diffraction grating area feasible for optical machine reading is constituted of grooves provided in the number of hundreds to thousands of grooves/mm at some part of the hologram forming layer, and has the properties that the light shed on this area is reflected in a given direction. Thus, its presence is machine-recognizable if a light-receiving device is provided in the Given direction. This diffraction grating area may be constituted of a single diffraction Grating so that the light shed thereon is reflected in a single direction. Alternatively, a plurality of diffraction gratings may be provided adjoiningly one another and the diffraction grating area may be constituted of the plural diffraction gratings so that the light shed on that area may be reflected in plural directions.

The image-recorded article produced using the intermediate transfer medium of such constitution is provided with the diffraction Grating area feasible for optical machine reading, in addition to the image pattern and the hologram image which are visible to the naked eye. Hence, the image-recorded article becomes correspondingly harder to forge or falsify and, even when forged or falsified, whether or not an image-recorded article is the original can be judged not only by the naked eye but also by mechanical reading. Thus, it becomes possible to surely detect whether or not image-recorded articles have been forged or falsified.

In place of the above diffraction grating area, a monochromatic-light reproduction type hologram recorded zone may be provided at some part of the hologram forming layer.

The monochromatic-light reproduction type hologram herein basically refers to a hologram including those of a Fresnel type or a Fourier transform type. As an example thereof, a hologram commonly called a master hologram, which is made up on the first step in the process of making up a hologram of a known two-step type corresponds to this hologram. More specifically, even when white light is shed on a recorded area of this hologram called the master hologram, the image of an object photographed in the first step is not visible to the naked eye when reproduced, and only has a color of iris. On the other hand, when a monochromatic light of a visible light laser or the like is shed thereon, the image of an object photographed in the first step becomes visible to the naked eye when reproduced.

The monochromatic-light reproduction type hologram is recognizable with difficulty under white light, and hence has the advantage that the hologram is harder to forge or falsify than the white-light reproduction type hologram. It, however, has a slight possibility that it can be forged using a dead copy if the interference fringes provided in the recorded area has a single directionality. This is because it is relatively easy for persons having a knowledge of holograms to make a forgery using what is called a dead copy, which is to make a copy of an information pattern recorded by applying laser light to the recorded area, on other photosensitive material.

Now,-a plurality of hologram patterns different one another in the directionality of interference fringes may be multi-recorded in the monochromatic-light reproduction type hologram recorded area and also the respective hologram patterns may be so made as to be simultaneously reproduced to form one information pattern. This makes it possible to completely prevent the forgery using the dead copy. More specifically, no more than a dead copy of part of the hologram pattern that constitutes one information pattern can be produced even if laser light is made incident on the hologram recorded area from one direction, so that it becomes difficult to make a complete dead copy of the information pattern recorded in the hologram recorded area.

The system of multi-recording a plurality of hologram patterns in the hologram recorded area may be replaced with the following constitution. That is, the hologram recorded area may be divided into a plurality of areas so that a plurality of hologram patterns different one another in the directionality of interference fringes can be separately recorded in the hologram recorded area divied into a plurality of regions and the respective hologram patterns are simultaneously reproduced to form one information pattern.

The image-recorded article produced using the intermediate transfer medium of the present invention can be used in any desired purposes as exemplified by marketable securities such as stock certificates, checks, stamps, postage stamps, bills, bonds, bankbooks, tickets, commutation tickets and theater tickets; commercial cards such as cash cards, credit cards, telephone cards, IC cards and optical cards; ID cards such as membership cards and identifications, passports, and various coupon tickets.

As described above, the intermediate transfer medium according to the present invention comprises the image-receiving adhesive layer in which the inorganic filler having a melting point of 200° C. or above or the organic filler having a softening point or decomposition point of 200° C. or above is added. Because of the action of this inorganic or organic filler, there is no possibility of transfer of the image-receiving adhesive layer to the transfer ribbon side in the step of forming the image pattern even when the thermoplastic resin that constitutes the image-receiving adhesive layer has a low heat-melting temperature. At the same time, it is unnecessary to use additives such as silicon. This is effective also for improving the adhesion of the intermediate transfer medium to the transfer substrate. Also, the thermoplastic resin that constitutes the image-receiving adhesive layer has a glass transition point of 50° C. or above. This is effective for causing no change of image quality on account of heat.

Between the release layer and the image-receiving adhesive layer, the hologram forming layer having a land-and-groove pattern that constitutes a white-light reproduction type hologram and the transparent thin-film layer having a larger refractive index than the hologram forming layer may be further provided in this order from the release layer side. This is effective for preventing forgery or falsification of the image pattern of the image-recorded article produced.

In addition, the lathe work printed layer or the information pattern printed layer may be provided between the release layer and the image-receiving adhesive layer or between the release layer and the hologram forming layer, or the diffraction grating area feasible for optical machine reading or the monochromatic-light reproduction type hologram recorded area may be provided at some part of the hologram forming layer. This is effective for better preventing forgery or falsification of the image pattern and also easily detecting whether or not it has been forged or falsified.

The present invention will be described below in greater detail by giving Examples. In the following, "part(s)" refers to "part(s) by weight".

EXAMPLE 1

| | |
|---|---|
| Composition of release layer coating material | |
| Polymethyl methacrylate (Tg: 105° C.) (trade name: BR-80; available from Mitsubishi Rayon Co., Ltd.) | 10 parts |
| Teflon powder | 1 part |
| Toluene/2-butanone (1/1) | 40 parts |
| Composition of hologram forming layer coating material | |
| Acrylic polyol resin (Tg: 75° C.; OH value: 100) | 25 parts |
| Nitrocellulose resin (nitrogen content: 12%; average degree of polymerization: 45; viscosity: 1/2) | 5 parts |
| Xylene diisocyanate | 5 parts |
| Toluene/2-butanone (25/20) | 45 parts |
| Isobutyl acetate | 20 parts |
| Composition of image-receiving adhesive layer coating material | |
| Vinyl chloride/vinyl acetate copolymer (Tg: 65° C.) (trade name: S-LEC A; availabe from Sekisui Chemical Co., Ltd.) | 10 parts |
| Melamine-formaldehyde condensate (decomposition point: 300° C.; softening point: none) (trade name: EPOSTAR S; available from Nippon Shokubai Kagaku Kogyo Co., Ltd.) | 2 parts |
| 2-(2'-Hydroxy-5'-methylphenyl)-benzotriazole | 2.5 parts |
| Toluene/2-butanone (2/1) | 40 parts |

To the surface of a 12 μm thick polyethylene terephthalate film, the above release layer coating material was applied using a gravure coater so as to be in a dried coating weight of 2.0 g/m$^2$, followed by drying to form a release layer 12. To the surface of this layer, the above hologram forming layer coating material was applied using a gravure coater so as to be in a dried coating weight of 1.2 g/m$^2$, followed by drying to form a hologram forming layer 13. After aging at 60° C. for 72 hours, the hologram forming layer 13 and a hologram pattern formed surface of a hologram stamper were put together using a pressing machine to carry out embossing under heating and pressing conditions of 160° C. and 40 kg/cm to form a land-and-groove pattern 3*a* on the hologram forming layer 13. Next, on the surface of the hologram forming layer 13, ZnS was vacuum-deposited in a thickness of about 500 Å to form a transparent thin-film layer 14. Subsequently, the above image-receiving adhesive layer coating material was applied using a gravure coater so as to be in a dried coating weight of 1.5 g/m$^2$, followed by drying to form an image-receiving adhesive layer 16. Thus, an intermediate transfer medium 1 was prepared (see FIG. 1).

Preparation of transfer ribbon:

Dyes corresponding to three colors (yellow, magenta and cyan) were each dispersed in polyvinyl butyral, and the resulting dispersions were applied using a gravure coater to the surface of a 6 μm thick polyester film in the manner that the respective colors are alternately provided (basically like the manner shown in FIG. 10), followed by drying to form a transfer ribbon 23 having three color heat-sublimation ink layers.

The intermediate transfer medium 1, the transfer ribbon 23 and a card material (a transfer substrate) 32 made of polyvinyl chloride were set on the apparatus as shown in FIG. 4.

How the apparatus operates will be described below. First, a yellow image pattern is formed on the intermediate transfer medium. A yellow heat-sublimation ink layer of the transfer ribbon 23 alternately provided with three color dyes was brought into contact with the image-receiving adhesive layer of the intermediate transfer medium, and yellow image data were drawn out from among image data having been inputted in an image processing unit (not shown) of the apparatus. Then, electrical signals corresponding thereto were applied to a thermal head 22 to carry out heating. In order to move the relative position of the thermal head 22 and the intermediate transfer medium 1, the drum 21 was rotated clockwise. Magenta and cyan ink layers were also similarly operated to form a multi-color image pattern on the intermediate transfer medium 1.

Next, the part in which the image pattern had been formed was delivered to a transfer zone 30, where it was registered with the card material (the transfer substrate) 32, and a heating roll 31 (heating temperature: 150° C.) was pressed against the intermediate transfer medium 1 so that the intermediate transfer medium 1 having the release layer and its underlying layers was transferred to the card material (the transfer substrate) 32. Thus a card (an image-recorded article) was produced. (At a final stage of the transfer, the base sheet of the intermediate transfer medium was separated therefrom together with the release film removed in the shape negatively corresponding to that of the card and was then taken off on a wind-up roll shown at the lower left in FIG. 4.)

The card (the image-recorded article) thus produced had a sharp image pattern 2*a* and, on this pattern, a white-light reproduction type hologram pattern formed in accordance with the land-and-groove pattern 3*a* (see FIG. 3).

EXAMPLE 2

Preparation of intermediate transfer medium:

—Composition of release layer coating material—The same composition as the release layer coating material in Example 1.

—Composition of hologram forming layer coating material—Substantially the same composition as the hologram forming layer coating material in Example 1 except that 25 parts by weight of the acrylic polyol resin (Tg: 75° C.; OH value: 100) was replaced with 25 parts by weight of an acrylic polyol resin (Tg: 75° C.; OH value: 130).

—Composition of image-receiving adhesive layer coating material—Substantially the same composition as the image-receiving adhesive layer coating material in Example 1 except that 2 parts by weight of the melamine-formaldehyde condensate (decomposition point: 300° C.; softening point: none) was replaced with 3 parts by weight of calcium carbonate.

To the surface of a 25 μm thick polyethylene terephthalate film, the above release layer coating material was applied using a gravure coater so as to be in a dried coating weight of 2.0 g/m$^2$, followed by drying to form a release layer 12. To the surface of this layer, the above hologram forming layer coating material was applied using a gravure coater so as to be in a dried coating weight of 0.9 g/m$^2$, followed by drying to form a hologram forming layer 13. After aging at 60° C. for 72 hours, the hologram forming layer 13 and a hologram pattern forming surface of a hologram stamper were put together using a pressing machine to carry out embossing under heating and pressing conditions of 160° C. and 40 kg/cm to form a land-and-groove pattern 3*a* on the hologram forming layer 13. Next, on the surface of the hologram forming layer 13, ZnS was vacuum-deposited in a thickness of about 500 Å to form a transparent thin-film layer 14. Subsequently, the above image-receiving adhesive layer coating material was applied using a gravure coater so as to be in a dried coating weight of 1.5 g/m$^2$, followed by drying to form an image-receiving adhesive layer 16. Thus, an intermediate transfer medium 1 was prepared.

Using the intermediate transfer medium 1 thus obtained, a card (an image-recorded article) was produced in the same manner as in Example 1.

EXAMPLE 3

Preparation of intermediate transfer medium:

| Composition of release layer coating material | |
|---|---|
| Epoxy resin (softening point: 148° C.) (trade name: EPIKOTE 1009; available from Yuka Shell Epoxy Kabushikikaisha) | 10 parts |
| Polyethylene powder | 0.5 part |
| Toluene/2-butanone (1/2) | 40 parts |

—Composition of hologram forming layer coating material—The same composition as the hologram forming layer coating material in Example 1.

| Composition of primer layer coating material | |
|---|---|
| Water-based polyurethane ionomer dispersion (trade name: HYDRAN AP40; available from DIC, Inc.; NV: 20% by weight) | 100 parts |
| **Composition of image-receiving adhesive layer coating material** | |
| Linear saturated polyester resin (Tg: 65° C.) (trade name: UE-3200; available from Unichika, Ltd.) | 10 parts |
| Polytetrafluoroethylene (softening point: 320° C.) (trade name: LUBRON LD1; available from Daikin Industries, Ltd.) | 1 part |
| 2-Hydroxy-4-methoxybenzophenone | 6 parts |
| Toluene/2-butanone (1/1) | 40 parts |

To the surface of a 25 μm thick polyethylene terephthalate film, the above release layer coating material was applied using a gravure coater so as to be in a dried coating weight of 2.0 g/m$^2$, followed by drying to form a release layer 12. To the surface of this layer, the above hologram forming layer coating material was applied using a gravure coater so as to be in a dried coating weight of 0.9 g/m$^2$, followed by drying to form a hologram forming layer 13. After aging at 60° C. for 72 hours, the hologram forming layer 13 and a hologram pattern forming surface of a hologram stamper were put together using a pressing machine to carry out embossing under heating and pressing conditions of 160° C. and 40 kg/cm to form a land-and-groove pattern 3*a* on the hologram forming layer 13. Next, on the surface of the hologram forming layer 13, ZnS was vacuum-deposited in a thickness of about 500 Å to form a transparent thin-film layer 14. To the surface of this layer, the above primer layer coating material was applied using a gravure coater so as to be in a dried coating weight of 1.0 g/m$^2$, followed by drying to form a primer layer 15. Subsequently, the above image-receiving adhesive layer coating material was applied using a gravure coater so as to be in a dried coating weight of 1.5 g/m$^2$, followed by drying to form an image-receiving adhesive layer 16. Thus, an intermediate transfer medium 1 was prepared (see FIG. 2).

Using the intermediate transfer medium 1 thus obtained, a card (an image-recorded article) was produced in the same manner as in Example 1.

EXAMPLE 4

Preparation of intermediate transfer medium:

An intermediate transfer medium was prepared in the same manner as in Example 2 except for using a release layer coating material in which as a release improver a linear saturated polyester resin (trade name: BYRON 300; available from Toyobo Co., Ltd.) was added in an amount of 2 parts by weight based on 100 parts by weight of the total weight of the thermoplastic resin and the antiabrasion agent.

Then, using the intermediate transfer medium 1 thus obtained, a card (an image-recorded article) was produced in the same manner as in Example 1.

EXAMPLE 5

Preparation of intermediate transfer medium:

An intermediate transfer medium was prepared in the same manner as in Example 3 except for using a release layer coating material in which as a release improver a linear saturated polyester resin (trade name: available from Toyobo Co., Ltd.) was added in an amount of 2 parts by weight based on 100 parts by weight of the total weight of the thermoplastic resin and the antiabrasion agent.

Then, using the intermediate transfer medium 1 thus obtained, a card (an image-recorded article) was produced in the same manner as in Example 1.

Evaluation on the cards (image-recorded articles) according to Examples 1 to 5

Adhesion, scratch resistance, wear resistance, plasticizer resistance, solvent resistance, heat resistance, forgery preventive performance and light-resistance of the cards (the image-recorded articles) produced in Examples 1 to 5 are shown in Table 2.

TABLE 2

| | Adhesion | (1) | (2) | Plasticizer resistance (hrs) | | | (3) | (4) | (5) | Light-resistance (%) | | |
|---|---|---|---|---|---|---|---|---|---|---|---|---|
| | | | | 24 | 48 | 100 | | | | Y | M | C |
| Example: | | | | | | | | | | | | |
| 1 | B | A | A | A | A | A | A | A | A | 12 | 10 | 10 |
| 2 | B | A | A | A | A | A | A | A | A | 11 | 10 | 10 |
| 3 | A | A | A | A | A | A | A | A | A | 24 | 12 | 23 |
| 4 | B | A | A | A | A | A | A | A | A | 12 | 10 | 10 |

TABLE 2-continued

| | Adhesion | (1) | (2) | Plasticizer resistance (hrs) 24 | 48 | 100 | (3) | (4) | (5) | Light-resistance (%) Y | M | C |
|---|---|---|---|---|---|---|---|---|---|---|---|---|
| 5 | A | A | A | A | A | A | A | A | A | 12 | 10 | 10 |

(1): Scratch resistance
(2): Wear resistance
(3): Solvent resistance
(4): Heat resistance
(5): Forgery preventive performance The respective data were obtained by making tests in the following way.

Adhesion:

A cellophane tape peel test (JIS K5400-1990, a cross cut test, also called a lattice pattern cutting test) was made. A card showing no change was evaluated as "A"; a card from which the layer was partly separated, as "B"; and a card from which the whole layer was separated, as "C".

Scratch resistance:

The surface was scratched using a pencil scratch tester with a pencil of a hardness H to measure the surface strength. A card whose surface had no scratches was evaluated as "A"; and a card whose surface had scratches, as "C".

Wear resistance:

Using a wear tester of a system for testing color fastness to rubbing (metal was used as an abrasion material), the surface of the card (the image-recorded article) was rubbed 2,000 times to observe any changes of the surface. A card caused no change was evaluated as "A"; and a card caused a change, as "C".

Plasticizer resistance:

A soft polyvinyl chloride sheet was brought into touch with the card (the image-recorded article), and a load of 200 g/cm$^2$ was applied, in the state of which the card was stored for 24 hours, 48 hours and 100 hours each in an environment of 40° C. and 90%RH. A card caused no change was evaluated as "A"; a card more or less caused a color change or fading or a blur, as "B"; and a card caused a color change or fading or a blur, as "C".

Solvent resistance:

A swab was impregnated with freon, ethanol or gasoline, and the surface of the card (the image-recorded article) was rubbed with it to observe any changes. A card caused no change at all was evaluated as "A"; and a card caused a change even once, as "C".

Heat resistance:

The card was stored for 48 hours in an environment of 50° C., 90%RH, and then any color change or fading of the image pattern was observed. A card caused no change was evaluated as "A"; and a card caused a color change or fading, as "C".

Forgery preventive performance:

A card in which the white-light reproduction type hologram was clearly recognizable was evaluated as "A"; a card in which no hologram pattern was recognizable, as "C"; and a card in which the hologram pattern was not clear, as "B".

Light-resistance:

After the card was irradiated with ultraviolet rays for 40 hours using a fadeometer, a rate of decrease in reflection density of the image pattern was measured on yellow (Y), magenta (M) and cyan (C).

Comparative Example 1

An intermediate transfer medium was prepared in the same manner as in Example 1 except that the composition of the image-receiving adhesive layer was changed to the one as shown below. Using the resulting intermediate transfer medium, it was attempted to produce a card (an image-recorded article) in the same manner as in Example 1, but the image-receiving adhesive layer melt-adhered to the transfer ribbon during the formation of an image pattern to make it difficult to complete the formation of the image pattern.

| Composition of image-receiving adhesive layer coating material | |
|---|---|
| Linear saturated polyester resin (Tg: 7° C.) (trade name: BYRON 300: available from Toyobo Co., Ltd.) | 10 parts |
| 2-(2'-Hydroxy-5'-methylphenyl)-benzotriazole | 2.5 parts |
| Toluene/2-butanone (2/1) | 40 parts |

Comparative Example 2

An intermediate transfer medium was prepared in the same manner as in Example 1 except that the composition of the image-receiving adhesive layer was changed to the one as shown below. Using the resulting intermediate transfer medium, it was attempted to produce a card (an image-recorded article) in the same manner as in Example 1, but, like Comparative Example 1, the image-receiving adhesive layer melt-adhered to the transfer ribbon during the formation of an image pattern to make it difficult to complete the formation of the image pattern.

| Composition of image-receiving adhesive layer coating material | |
|---|---|
| Vinyl chloride/vinyl acetate copolymer (Tg: 65° C.) (trade name: S-LEC A: available from Sekisui Chemical Co., Ltd.) | 10 parts |
| 2-(2'-Hydroxy-5'-methylphenyl)-benzotriazole | 2.5 parts |
| Toluene/2-butanone (2/1) | 40 parts |

Comparative Example 3

An intermediate transfer medium was prepared in the same manner as in Example 1 except that the composition of the image-receiving adhesive layer was changed to the one as shown below. Using the resulting intermediate transfer medium, it was attempted to produce a card (an image-recorded article) in the same manner as in Example 1. As a result, although it was possible to avoid the melt-adhesion of the image-receiving adhesive layer of the intermediate transfer medium to the transfer ribbon because of the action of silicon oil added in the image-receiving adhesive layer coating material, the adhesion between the image-receiving adhesive layer and the card material (the transfer substrate) comprised of polyvinyl chloride was so poor that it was difficult to obtain a card (an image-recorded article).

Composition of image-receiving adhesive layer coating material

-continued

| | |
|---|---|
| Linear saturated polyester resin (Tg: 7° C.) (trade name: BYRON 300; available from Toyobo Co., Ltd.) | 10 parts |
| Silicone oil (trade name: TSF451-M; available from Toshiba Silicone Co., Ltd.) | 0.5 parts |
| 2-(2'-Hydroxy-5'-methylphenyl)-benzotriazole | 2.5 parts |
| Toluene/2 butanone (2/1) | 40 parts |

Comparative Example 4

An intermediate transfer medium was prepared in the same manner as in Example 1 except that the composition of the image-receiving adhesive layer was changed to the one as shown below. Using the resulting intermediate transfer medium, a card (an image-recorded article) was produced in the same manner as in Example 1.

In the present Comparative Example, although a melamine-formaldehyde condensate (an organic filler) was added in the image-receiving adhesive layer coating material, the image-receiving adhesive layer of the intermediate transfer medium was seen to have a little adhered to the transfer ribbon during the formation of the image pattern. The heat resistance of the card (the image-recorded article) thus obtained was also tested by the method described above. As a result, the image pattern seriously caused a color change or fading, and was evaluated as "C".

| Composition of image-receiving adhesive layer coating material | |
|---|---|
| Linear saturated polyester resin (Tg: 7° C.) (trade name: BYRON 300; available from Toyobo Co., Ltd.) | 10 parts |
| Melamine-formaldehyde condensate (decomposition point: 300° C.; softening point: none) (trade name: EPOSTAR S; available from Nippon Shokubai Kagaku Kogyo Co., Ltd.) | 5 parts |
| 2-(2'-Hydroxy-5'-methylphenyl)-benzotriazole | 2.5 parts |
| Toluene/2-butanone (2/1) | 40 parts |

Comparative Example 5

An intermediate transfer medium was prepared in the same manner as in Example 1 except that the composition of the image-receiving adhesive layer was changed to the one as shown below. Using the resulting intermediate transfer medium, a card (an image-recorded article) was produced in the same manner as in Example 1.

In the present Comparative Example, in which a resin (polycarbonate) having a high heat-melting temperature was used in the image-receiving adhesive layer, its heat transfer to the card material (the transfer substrate) had to be carried out at a high temperature, so that a thermal deformation was seen in the resulting card (the image-recorded article) and also a color change or fading was seen in the image pattern.

| Composition of image-receiving adhesive layer coating material | |
|---|---|
| Polycarbonate (Tg: 148° C.) (trade name: PANLITE AD5503; available from Teijin Chemicals Ltd.) | 10 parts |
| 2-(2'-Hydroxy-5'-methylphenyl)-benzotriazole | 2.5 parts |
| Toluene/2-butanone (2/1) | 40 parts |

EXAMPLE 6

Preparation of intermediate transfer medium:

—Composition of release layer coating material—The same composition as the release layer coating material in Example .

—Composition of image-receiving adhesive layer coating material—The same composition as the image-receiving adhesive layer coating material in Example 1.

Figure 5:
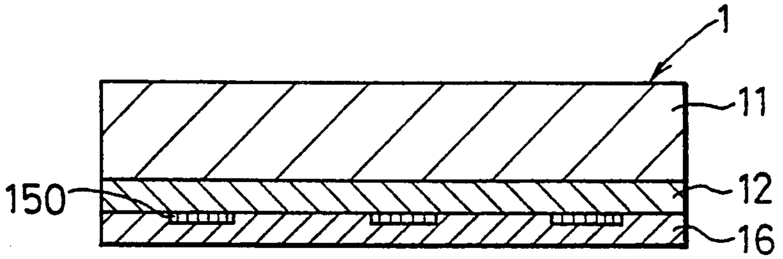
FIG. 5 is a cross-sectional illustration of an intermediate transfer medium according to Example 6.

To the surface of a 12 μm thick polyethylene terephthalate film, the above release layer coating material was applied using a gravure coater so as to be in a dried coating weight of 2.0 g/m$^2$, followed by drying to form a release layer 12. On the surface of this layer, a lathe work printed layer 150 was formed by gravure printing using a gravure ink (trade name: VCH 79 Green; available from Toyo Ink Mfg. Co., Ltd.). Subsequently, the above image-receiving adhesive layer coating material was applied using a gravure coater so as to be in a dried coating weight of 1.5 g/m$^2$, followed by drying to form an image-receiving adhesive layer 16. Thus, an intermediate transfer medium 1 was prepared (see FIG. 5).

Using the intermediate transfer medium 1 thus obtained, a card (an image-recorded article) was produced in the same manner as in Example 1.

The card (the image-recorded article) thus produced had a sharp image pattern and on this pattern the lathe work printed layer 150.

EXAMPLE 7

Preparation of intermediate transfer medium:

—Composition of release layer coating material—The same composition as the release layer coating material in Example 1.

| Composition of diffusion preventive layer coating material | |
|---|---|
| Nitrocellulose (trade name: CEL-LINE FM200; available from Daicel Chemical Industries, Ltd.) | 15 parts |
| Toluene/2-butanone 1/2) | 85 parts |

—Composition of image-receiving adhesive layer coating material—The same composition as the image-receiving adhesive layer coating material in Example 2.

To the surface of a 25 μm thick polyethylene terephthalate film, the above release layer coating material was applied using a gravure coater so as to be in a dried coating weight of 2.0 g/m$^2$, followed by drying to form a release layer 12. On the surface of this layer, a lathe work printed layer 150 was formed by gravure printing using a gravure ink (trade name: GNC-ST39 Indigo; available from Toyo Ink Mfg. Co., Ltd.). To the surface of this layer, the above diffusion preventive layer coating material was applied using a gravure coater so as to be in a dried coating weight of 0.8 g/m$^2$, followed by drying to form a diffusion preventive layer Subsequently, the above image-receiving adhesive layer coating material was applied using a gravure coater so as to be in a dried coating weight of 1.5 g/m$^2$, followed drying to form an image-receiving adhesive layer 16. Thus, an intermediate transfer medium 1 was prepared (see FIG. 6).

Using the intermediate transfer medium 1 thus obtained, a card (an image-recorded article) was produced in the same manner as in Example 6.

Figure 7:
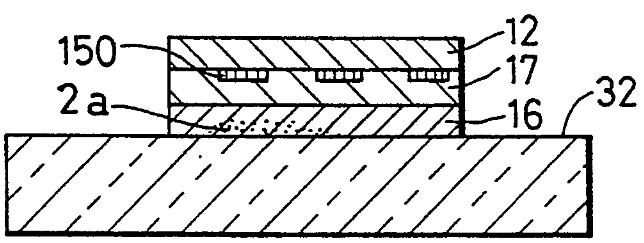
FIG. 7 is a cross-sectional illustration of the intermediate transfer medium according to Example 7 having been transferred to a transfer substrate.

The card (the image-recorded article) thus produced had a sharp image pattern 2*a* and on this pattern the lathe work printed layer 150 (see FIG. 7).

EXAMPLE 8

Preparation of intermediate transfer medium:

—Composition of release layer coating material—The same composition as the release layer coating material in Example 3.

—Composition of diffusion preventive layer coating material—The same composition as the diffusion preventive layer coating material in Example 7.

—Composition of image-receiving adhesive layer coating material—The same composition as the image-receiving adhesive layer coating material in Example 3.

To the surface of a 25 μm thick polyethylene terephthalate film, the above release layer coating material was applied using a gravure coater so as to be in a dried coating weight of 2.0 $g/m^2$ followed by drying to form a release layer 12. To the surface of this layer, the above diffusion preventive layer coating material was applied using a gravure coater so as to be in a dried coating weight of 0.8 $g/m^2$, followed by drying to form a diffusion preventive layer 17, and on the surface of this layer, a lathe work printed layer 150 was formed by gravure printing using a gravure ink (trade name: MTGN-83 Violet; available from Toyo Ink Mfg. Co., Ltd.). Subsequently, the above image-receiving adhesive layer coating material was applied using a gravure coater so as to be in a dried coating weight of 1.5 $g/m^2$, followed by drying to form an image-receiving adhesive layer 16. Thus, an intermediate transfer medium 1 was prepared.

Using the intermediate transfer medium 1 thus obtained, a card (an image-recorded article) was produced in the same manner as in Example 6.

EXAMPLE 9

Preparation of intermediate transfer medium:

An intermediate transfer medium was prepared in the same manner as in Example 7 except for using a release layer coating material in which as a release improver a linear saturated polyester resin (trade name: BYRON 300; available from Toyobo Co., Ltd.) was added in an amount of 2 parts by weight based on 100 parts by weight of the total weight of the thermoplastic resin and the antiabrasion agent. Then, using the intermediate transfer medium 1 thus obtained, a card (an image-recorded article) was produced in the same manner as in Example 6.

EXAMPLE 10

Preparation of intermediate transfer medium:

An intermediate transfer medium was prepared in the same manner as in Example 8 except for using a release layer coating material in which as a release improver a linear saturated polyester resin (trade name: BYRON 300; available from Toyobo Co., Ltd.) was added in an amount of 2 parts by weight based on 100 parts by weight of the total weight of the thermoplastic resin and the antiabrasion agent.

Then, using the intermediate transfer medium 1 thus obtained, a card (an image-recorded article) was produced in the same manner as in Example 6.

Evaluation on the cards (image-recorded articles) according to Examples 6 to 10

Adhesion, scratch resistance, wear resistance, plasticizer resistance, solvent resistance, heat resistance, forgery preventive performance and light-resistance of the cards (the image-recorded articles) produced in Examples 6 to 10 were each measured to obtain substantially the same data as in Examples 1 to 5.

Here, the forgery preventive performance was judged according to whether or not the lathe work printed layer was clearly recognizable.

EXAMPLE 11

Figure 8A:
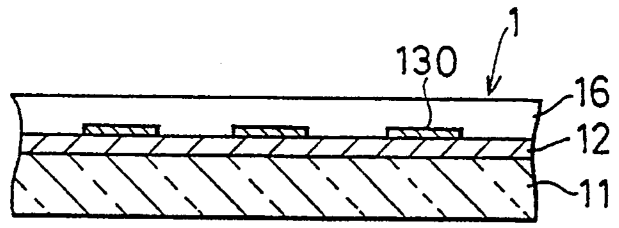
FIG. 8A is a cross-sectional illustration of an intermediate transfer medium according to Example 11.

The intermediate transfer medium 1 according to the present Example is mainly comprised of, as shown in FIG. 8A, a base sheet 11 formed of a 25 μm thick biaxially oriented polyethylene terephthalate film, a release layer 12 provided on this base sheet 11, an information pattern printed layer (a pattern in which letters "TOP" have been successively formed) 130 provided on the release layer and containing the following pigment (a phosphate type white crystalline compound containing a cupric salt), and an image-receiving adhesive layer 16 provided on the whole surface of the release layer 12 including the information pattern printed layer 130.

Preparation of intermediate transfer medium:

First, a phosphate type composition having the following composition was melted and the resulting molten product was crystallized to give a phosphate type white crystalline compound.

| Phosphate type composition | |
|---|---|
| $P_2O_5$ | 50.0% by weight |
| CuO | 49.5% by weight |
| ZnO | 0.5% by weight |

This compound was analyzed by X-ray diffraction using an X-ray tube having an anode made of copper, to ascertain that strong peaks appeared at diffraction angles (2θ) of 28.14, 30.07, 30.34 and 44.01 and the compound had been crystallized.

Next, the phosphate type white crystals were pulverized into powder, and the resulting powder was used as an infrared ray absorbing pigment to prepare an infrared ray absorbing ink having the following composition.

| Composition of infrared ray absorbing ink | |
|---|---|
| Pigment (a phosphate type white crystalline compound containing a cupric salt) | 30 parts |
| Vinyl chloride/vinyl acetate copolymer resin | 10 parts |
| Polyester resin | 5 parts |
| Toluene | 30 parts |
| Methyl isobutyl ketone | 30 parts |
| **Composition of release layer coating material** | |
| Acrylic resin | 25 parts |
| Toluene | 40 parts |
| Methyl ethyl ketone | 20 parts |
| Methyl isobutyl ketone | 15 parts |
| **Composition of image-receiving adhesive layer coating material** | |
| Polyester resin (Tg: 75° C.) (trade name: ELITEL UE3600; available from Unichika, Ltd.) | 40 parts |
| Vinyl chloride/vinyl acetate copolymer resin | 5 parts |

-continued

| | |
|---|---|
| (Tg: 65° C.) (trade name: S-LEC A; available from Sekisui Chemical Co., Ltd.) | |
| Calcium carbonate | 3 parts |
| Methyl ethyl ketone | 40 parts |
| Toluene | 40 parts |

To the surface of a base sheet 11 comprised of a 25 μm thick biaxially oriented polyethylene terephthalate film, the above release layer coating material was applied using a gravure coater at a drying temperature of 110° C. in a coating thickness of 1.5 μm to form the release layer 12. On its surface, printing was carried out using the above infrared ray absorbing ink by silk screen printing in a layer thickness of 1.0 μm to form the information pattern printed layer (a pattern in which letters "TOP" had been successively formed) 130. Then, to the surface of this layer the above image-receiving adhesive layer coating material was applied using a gravure coater at a drying temperature of 110° C. in a coating thickness of 2.0 μm to form the image-receiving adhesive layer 16. Thus, an intermediate transfer medium 1 as shown in FIG. 8A was prepared.

Figure 8B:
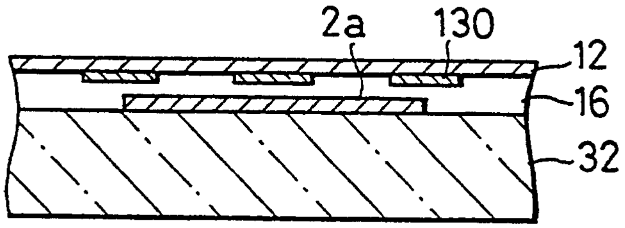
FIG. 8B is a cross-sectional illustration of an image-recorded article produced using this intermediate transfer medium.

Next, using the intermediate transfer medium 1 thus obtained, the intermediate transfer medium having the release layer 12 and its underlying layers was transferred to a card material (a transfer substrate) 32 with a white color, made of polyvinyl chloride, in the same manner as in Example 1. Thus, a card (an image-recorded article) was produced (see FIG. 8B).

Figure 8C:
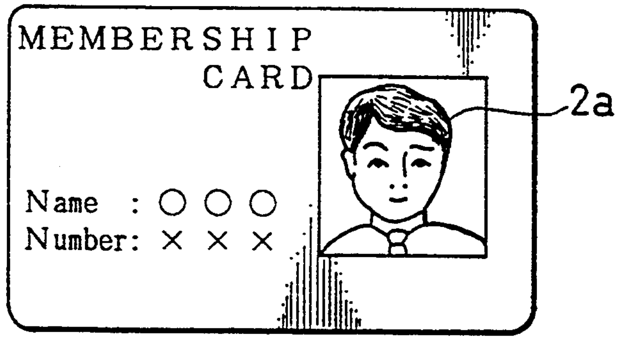
FIG. 8C is a front view of this image-recorded article.

The card (the image-recorded article) thus produced was viewed with the naked eye to find that as shown in FIG. 8C an image pattern 2a comprised of a portrait photograph was recognizable, but the information pattern printed layer 130 with a color similar to that of the card material (the transfer substrate) 32 with a white color was visible with difficulty.

Figure 8D:
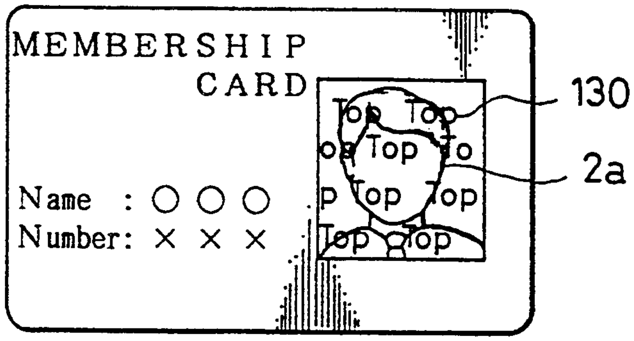
FIG. 8D is a front view of the image-recorded article on which an information pattern printed layer is machine-read.

Meanwhile, the card (the image-recorded article) was irradiated with semiconductor laser beams of 750 nm, 780 nm, 810 nm, 830 nm, 905 nm and so forth to find that as shown in FIG. 8D the information pattern printed layer 130 was machine-read as a black pattern since these laser beams were absorbed by the phosphate type white crystalline compound containing a cupric salt, contained in the information pattern printed layer 130.

EXAMPLE 12

Figure 9A:
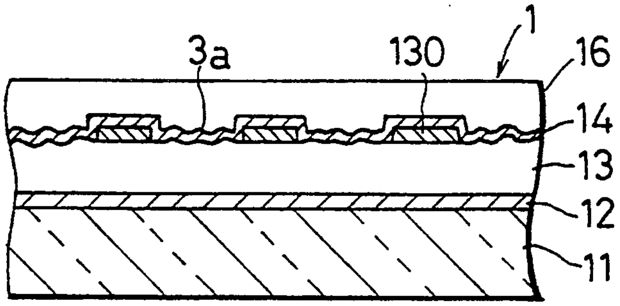
FIG. 9A is a cross-sectional illustration of an intermediate transfer medium according to Example 12.

The intermediate transfer medium according to the present Example is mainly comprised of, as shown in FIG. 9A, a base sheet 11 formed of a 25 μm thick biaxially oriented polyethylene terephthalate film, a release layer 12 provided on this base sheet 11, a hologram forming layer 13 provided on the release layer 12 and having a land-and-groove pattern 3a constituting a white-light reproduction type hologram, an information pattern printed layer (a pattern in which letters "TOP" have been successively formed) 130 provided on the hologram forming layer 13 and containing the pigment described above (the phosphate type white crystalline compound containing a cupric salt), a transparent thin-film layer 14 provided along the land-and-groove surface and comprised of a material (ZnS) having a larger refractive index than the hologram forming layer 13, and an image-receiving adhesive layer 16 provided on the transparent thin-film layer 14.

This intermediate transfer medium 1 was prepared by the following process.

Preparation of intermediate transfer medium:

—Composition of release layer coating material—The same composition as the release layer coating material in Example 11.

| Composition of hologram forming layer coating material | |
|---|---|
| Mixture of vinyl chloride/vinyl acetate copolymer resin with urethane resin | 35 parts |
| Methyl ethyl ketone | 60 parts |
| Toluene | 30 parts |

—Composition of image-receiving adhesive layer coating The same composition as the image-receiving adhesive layer coating material in Example 11.

To the surface of a base sheet 11 comprised of a 25 μm thick biaxially oriented polyethylene terephthalate film, the above release layer coating material was applied using a gravure coater at a drying temperature of 110° C. in a coating thickness of 1.5 μm to form the release layer 12. To the surface of this layer, the above hologram forming layer coating material was applied using a gravure coater at a drying temperature of 110° C. in a coating thickness of 2.0 μm, followed by drying to form the hologram forming layer 13. Thereafter, the hologram forming layer 13 and a hologram pattern forming surface of a hologram stamper (not shown) were put together using a pressing machine to carry out embossing under heating conditions of 160° C. to form a land-and-groove pattern 3a on the hologram forming layer 13.

Next, on the surface of the hologram forming layer 13 provided with the land-and-groove pattern 3a, printing was carried out using the above infrared ray absorbing ink by silk screen printing in a layer thickness of 1.0 μm to form the information pattern printed layer (the pattern in which letters "TOP" had been successively formed) 130. Then, on the surface of this layer, ZnO was vacuum-deposited in a thickness of about 800 Å to form the transparent thin-film layer 14. Subsequently, to the surface of the transparent thin-film layer 14, the above image-receiving adhesive layer coating material was applied using a gravure coater at a drying temperature of 110° C. in a coating thickness of 2.0 μm to form the image-receiving adhesive layer 16. Thus, an intermediate transfer medium 1 as shown in FIG. 9A was prepared.

Figure 9B:
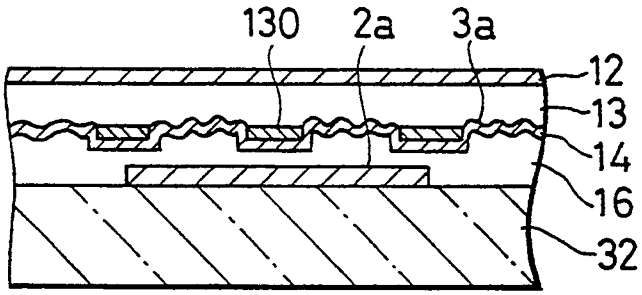
FIG. 9B is a cross-sectional illustration of an image-recorded article produced using this intermediate transfer medium.

Next, using the intermediate transfer medium 1 thus obtained, the intermediate transfer medium having the release layer 12 and its underlying layers was transferred to a card material (a transfer substrate) 32 with a white color, comprised of polyvinyl chloride, in the same manner as in Example 11. Thus, a card (an image-recorded article) was produced (see FIG. 9B).

Figure 9C:
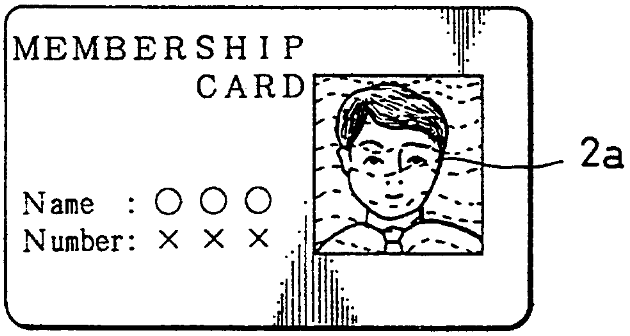
FIG. 9C is a front view of this image-recorded article.

The card (the image-recorded article) thus produced was viewed with the naked eye to find that as shown in FIG. 9C a hologram pattern and an image pattern 2a comprised of a portrait photograph was recognizable, but the information pattern printed layer 130 with a color similar to that of the card material (the transfer substrate) 32 with a white color was visible with difficulty.

Figure 9D:
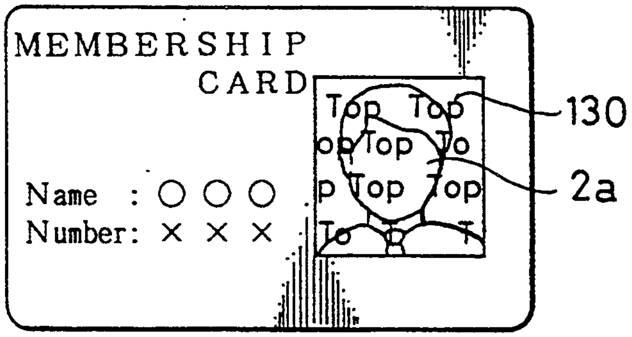
FIG. 9D is a front view of the image-recorded article, on which an information pattern print layer is machine-read.

Meanwhile, the card (the image-recorded article) was irradiated with semiconductor laser beams of 750 nm, 780 nm, 810 nm, 830 nm, 905 nm and so forth to find that as shown in FIG. 9D the information pattern printed layer 130 was machine-read as a black pattern since these laser beams were absorbed by the phosphate type white crystalline compound containing a cupric salt, contained in the information pattern printed layer 130.

In the present Example, the information pattern printed layer 130 containing an infrared ray absorbing substance is formed between the hologram forming layer 13 and the transparent thin-film layer 14. It has been ascertained that cards (image-recorded articles) functionable similarly to the card of Example 12 described above can be obtained also when a card (an image-recorded article) is produced using an intermediate transfer medium in which the information pattern printed layer 130 is formed between the release layer 12 and the hologram forming layer 13 and an intermediate transfer medium in which the information pattern printed layer 130 is formed between the transparent thin-film layer 14 and the image-receiving adhesive layer 16.

EXAMPLE 13

Preparation of intermediate transfer medium:

—Composition of release layer coating material—The same composition as the release layer coating material in Example 1.

—Composition of hologram forming layer coating material—The same composition as the hologram forming layer coating material in Example 1.

—Composition of image-receiving adhesive layer coating material—Substantially the same composition as the image-receiving adhesive layer coating material in Example 1 except that 2 parts by weight of the melamine-formaldehyde condensate (decomposition point: 300° C.; softening point: none) was replaced with 1 part by weight of calcium carbonate.

To the surface of a 12 μm thick polyester film, the above release layer coating material was applied using a gravure coater so as to be in a dried coating weight of 2.0 $g/m^2$, followed by drying to form a release layer. To the surface of this layer, the above hologram forming layer coating material was applied using a gravure coater so as to be in a dried coating weight of 1.2 $g/m^2$, followed by drying to form a hologram forming layer. After aging at 60° C. for 72 hours, the hologram forming layer and a hologram pattern forming surface of a hologram stamper were put together using a pressing machine to carry out embossing under heating and pressing conditions of 160° C. and 40 kg/cm to form a land-and-groove pattern on the hologram forming layer. Next, on the surface of the hologram forming layer, ZnS was vacuum-deposited in a thickness of about 500 Å to form a transparent thin-film layer. Subsequently, the above image-receiving adhesive layer coating material was applied using a gravure coater so as to be in a dried coating weight of 1.5 $g/m^2$, followed by drying to form an image-receiving adhesive layer. Thus, an intermediate transfer medium was prepared.

Figure 10:
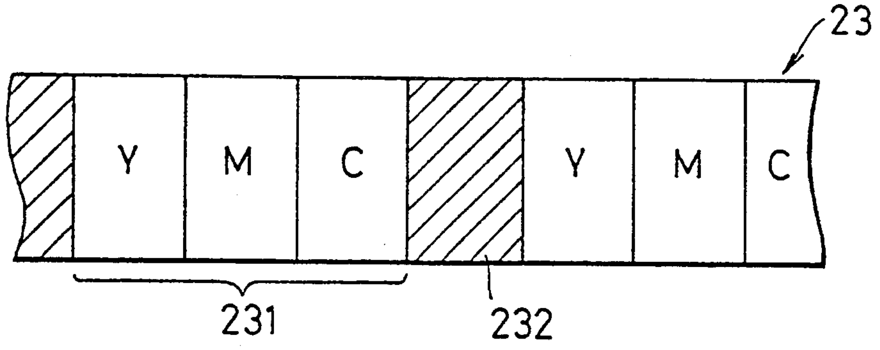
FIG. 10 illustrates a transfer ribbon used in Example 13.

Preparation of transfer ribbon:

Meanwhile, using a heat-sublimation ink prepared by dissolving or dispersing dyes respectively corresponding to three colors (yellow, magenta and cyan) in polyvinyl butyral resin and a coloring heat-melting ink composed as shown below, heat-sublimation ink layers 231 and coloring heat-melting ink layers 232 were formed by coating using a gravure coater on a 6 μm thick polyester film in the manner that they were alternately repeatedly arranged, followed by drying to produce a transfer ribbon 23 (see FIG. 10).

| Composition of coloring heat-melting ink | |
|---|---|
| Carbon black | 12 parts |
| Acrylic resin (trade name: BR-64; available from Mitsubishi Rayon Co., Ltd.) | 60 parts |
| Vinyl chloride/vinyl acetate copolymer (trade name: VAGH; available from UCC) | 18 parts |
| Teflon powder | 6 parts |

The intermediate transfer medium 1, the transfer ribbon 23 and a card material (a transfer substrate) 32 made of polyvinyl chloride were set on the apparatus as shown in FIG. 4.

Figure 11:
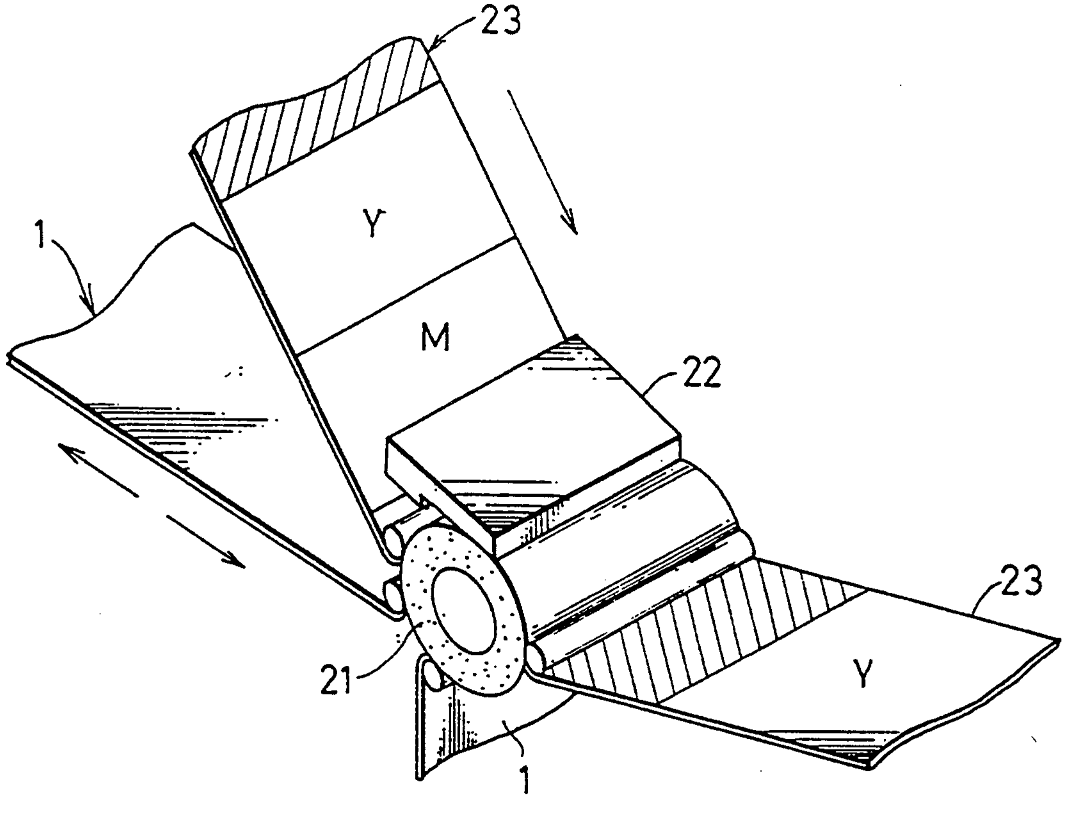
FIG. 11 is a perspective illustration of the positional relationship of a transfer ribbon, an intermediate transfer medium, a thermal head and so forth in Example 13.

How the apparatus operates will be described below. First, a yellow part (Y) of the heat-sublimation ink layer 231 of the transfer ribbon 23 was brought into contact with the image-receiving adhesive layer of the intermediate transfer medium 1. Then, yellow image data were drawn out from among image data having been inputted in an image processing unit (not shown) of the apparatus, and electrical signals corresponding thereto were applied to a thermal head 22 to carry out heating. Magenta and cyan parts were also similarly operated to form a color multi-level image pattern on the intermediate transfer medium 1. Similarly, the coloring heat-melting ink layers 232 were transferred to form on the intermediate transfer medium 1 a binary image pattern formed of letters and figures (see FIG. 11). In this example, the binary image pattern was formed after the multi-level image pattern was formed. This order may be reversed.

Next, the part in which the image pattern had been formed was delivered to a transfer zone 30, where it was registered with a card material (a transfer substrate) 32, and a heating roll 31 (heating temperature: 150° C.) was pressed against the intermediate transfer medium 1 so that the intermediate transfer medium 1 having the release layer and its underlying layers was transferred to the card material (the transfer substrate) 32. Thus a card (an image-recorded article) was produced.

In the card (the image-recorded article) thus produced, the binary image pattern has a good contrast wherein the reflection density of the binary image pattern is 2 or more. Hence, this card has an advantage that optical machine reading can be performed at a high speed.

EXAMPLE 14

Figure 12A:
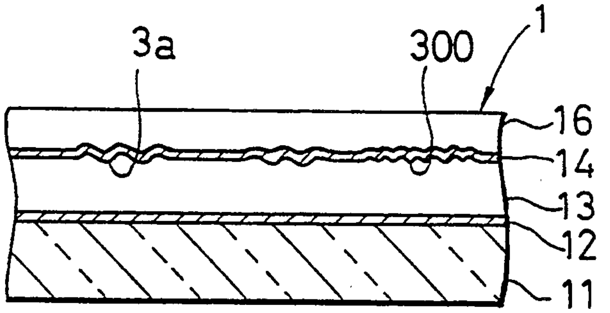
FIG. 12A is a cross-sectional illustration of an intermediate transfer medium according to Example 14.
Figure 12B:
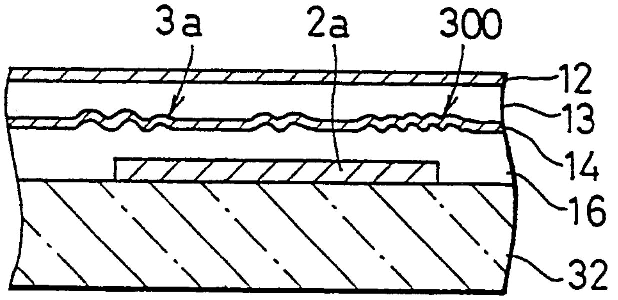
FIG. 12B is a cross-sectional illustration of an image-recorded article produced using this intermediate transfer medium.

The intermediate transfer medium according to the present Example is comprised of, as shown in FIG. 12A, a base sheet 11 formed of a 25 μm thick biaxially oriented polyethylene terephthalate film, a release layer 12 provided on this base sheet 11, a hologram forming layer 13 provided on the release layer 12 and having i) a land-and-groove pattern *3a* constituting a white-light reproduction type hologram and ii) a diffraction grating area 300 feasible for machine reading, a transparent thin-film layer 14 provided on the hologram forming layer 13 and comprised of a material (ZnS) having a larger refractive index than the hologram forming layer 13, and an image-receiving adhesive layer 16 provided on the transparent thin-film layer 14. The diffraction grating area 300 is, as shown in FIG. 12D, comprised of four diffraction gratings 301 to 304 which are provided adjoiningly one another in rectangular regions, have diffraction directions different from one another by 90° and each have a specific spatial frequency.

This intermediate transfer medium was prepared by the following process.

| | |
|---|---|
| Composition of release layer coating material | |
| Acrylic resin | 30 parts |
| Toluene | 40 parts |
| Methyl ethyl ketone | 40 parts |
| Methyl isobutyl ketone | 2 parts |
| Composition of hologram forming layer coating material | |
| Mixture of vinyl Chloride/vinyl acetate copolymer resin with urethane resin | 25 parts |
| Methyl ethyl ketone | 70 parts |
| Toluene | 30 parts |

—Composition of image-receiving adhesive layer coating material—The same composition as the image-receiving adhesive layer coating material in Example 11.

To the surface of a base sheet 11 comprised of a 25 μm thick biaxially oriented polyethylene terephthalate film, the above release layer coating material was applied using a gravure coater at a drying temperature of 110° C. in a coating thickness of 1.5 μm to form the release layer 12. To the surface of this layer, the above hologram forming layer coating material was applied using a gravure coater at a drying temperature of 110° C. in a coating thickness of 2.0 μm, followed by drying to form the hologram forming layer 13. Thereafter, the hologram forming layer 13 and a hologram stamper made of nickel (not shown) on which negatives of the diffraction grating area 300 and a land-and-groove pattern **3*a* had been formed were put together using a pressing machine to carry out embossing under heating conditions of 160° C. to form a pattern of the diffraction grating area 300 and the land-and-groove pattern 3*a* on the hologram forming layer 13**.

Next, on the surface of this hologram forming layer 13, ZnO was vacuum-deposited in a thickness of about 800 Å to form the transparent thin-film layer 14. Then, to the surface of the transparent thin-film layer 14, the image-receiving adhesive layer coating material as used in Example 11 was applied using a gravure coater at a drying temperature of 110° C. in a coating thickness of 2.0 μm to form an image-receiving adhesive layer 16. Thus, an intermediate transfer medium 1 as shown in FIG. 12A was prepared.

Using the intermediate transfer medium 1 thus obtained, the intermediate transfer medium having the release layer 12 and its underlying layers was transferred to a card material (a transfer substrate) 32 with a white color, comprised of polyvinyl chloride, in the same manner as in Example 1. Thus, a card (an image-recorded article) having a hologram pattern, an image pattern **2*a* and the diffraction grating area 300** was produced.

Figure 12C:
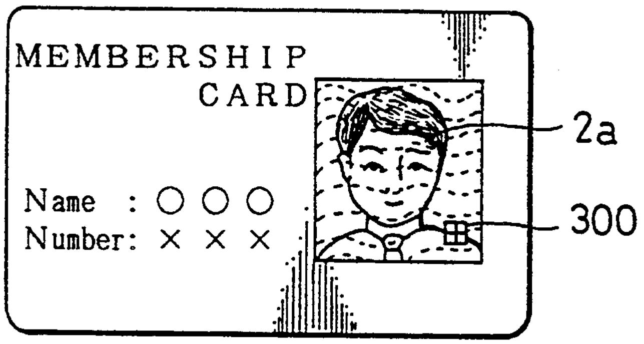
FIG. 12C is a front view of this image-recorded article.
Figure 12D:
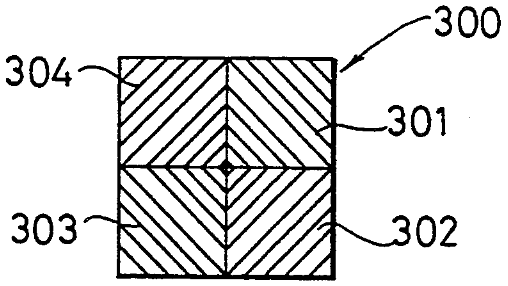
FIG. 12D is an enlarged view of a diffraction grating area provided in this image-recorded article.

The card (the image-recorded article) thus produced was viewed with the naked eye to find that as shown in FIG. 12C a hologram pattern and the image pattern 2a comprised of a portrait photograph was recognizable, but the diffraction grating area 300 was only recognizable as a mere reflective pattern.

Figure 13:
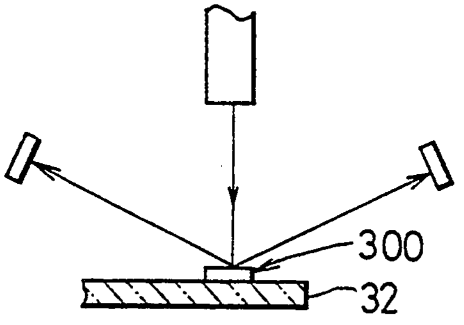
FIG. 13 illustrates a state in which the diffraction grating area is irradiated with laser light to machine-read whether or not the image-recorded article according to Example 14 is proper.
Figure 14:
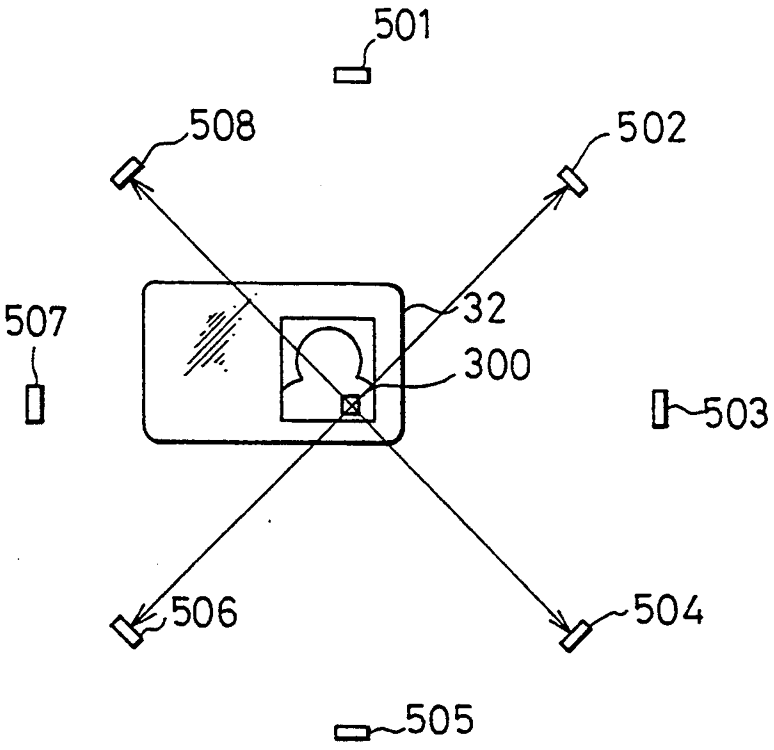
FIG. 14 illustrates the machine reading.

The card (the image-recorded article) was set on a given position of a machine reading unit and, as shown in FIG. 13C, irradiated with a semiconductor laser beam of 780 nm from the just upper part of the diffraction grating area 300, so that the laser beam was reflected in the directions different from one another by 90° by the action of the diffraction gratings 301 to 304 of the diffraction grating area 300. Then, these reflected light beams were detected by light-receiving devices 502, 504, 506 and 508 provided in the respective directions (see FIG. 14), and thus it was possible to perform machine recognition on whether or not the card (the image-recorded article) was proper. More specifically, if the diffraction grating area 300 has been forged or falsified, the reflected beams are by no means made incident on the light-receiving devices 502, 504, 506 and 508 even when the card (the image-recorded article) is set on the given position and irradiated with the semiconductor laser beams, so that it can be machine-read that the card has been forged or falsified.

EXAMPLE 15

Figure 15A:
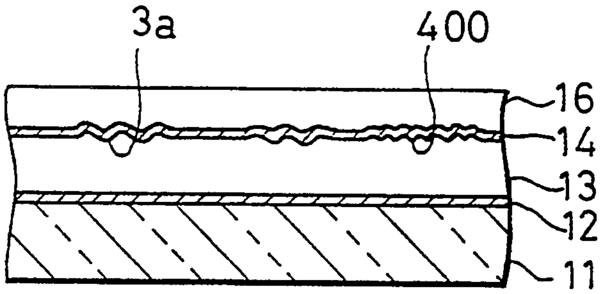
FIG. 15A is a cross-sectional illustration of an intermediate transfer medium according to Example 15.
Figure 15B:
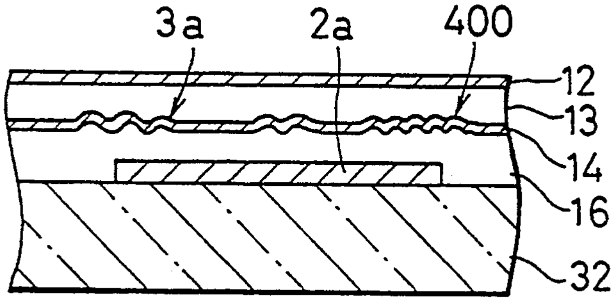
FIG. 15B is a cross-sectional illustration of an image-recorded article produced using this intermediate transfer medium.
Figure 15C:
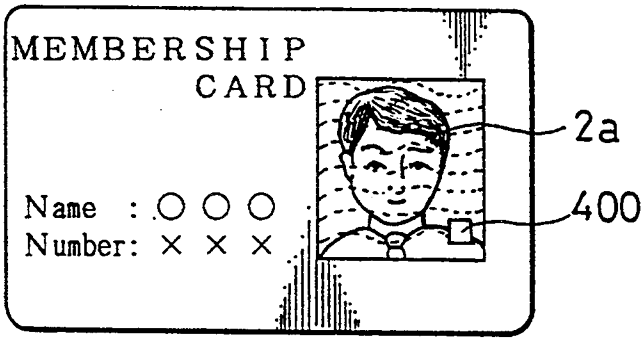
FIG. 15C is a front view of this image-recorded article.

The intermediate transfer medium according to the present Example is substantially the same as the intermediate transfer medium according to Example 14 except that, in place of the diffraction grating area 300 provided on the hologram forming layer 13, a monochromatic-light reproduction type hologram recorded area 400 is provided at some part of the hologram forming layer and two hologram patterns having interference fringes with directionalities different from each other are multi-recorded in the hologram recorded area 400 (see FIGS. 15A–15C). The release layer coating material, the hologram forming layer coating material and the image-receiving adhesive layer coating material each have the same composition as those in Example 14, and the methods for preparing the intermediate transfer medium and producing a card (an image-recorded article) by the use of the intermediate transfer medium are also substantially the same as those in Example 14 except the following.

That is, a hologram stamper made of nickel and on which a negative of the hologram recorded area 400 having the multi-recorded two hologram patterns has been formed is produced by using a master prepared by the process as shown below and carrying out known electroforming using the master obtained.

Figure 16:
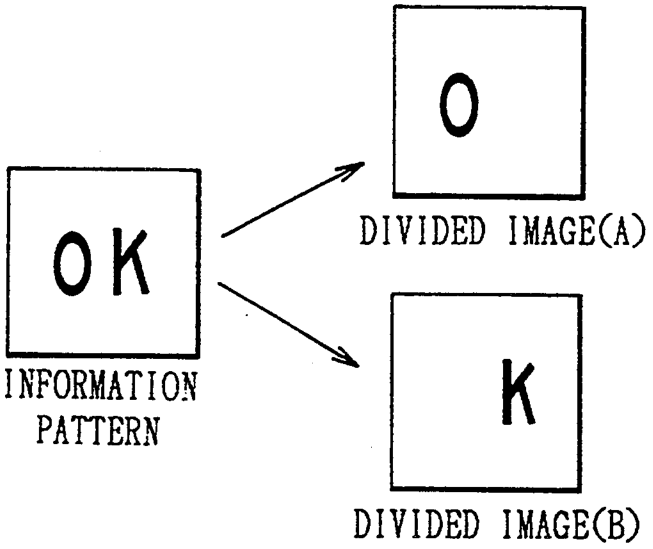
FIG. 16 illustrates the relationship between an information pattern and divided images according to Example 15.

Preparation of master:

FIG. 16 diagrammatically illustrates the relationship between one information pattern (comprised of, e.g., letters "OK") and divided images (patterns). In the present Example, the information pattern is divided into two images A and B to prepare transmission-type originals. The information pattern may be formed of either a halftone dot image or a continuous tone image.

Figure 17:
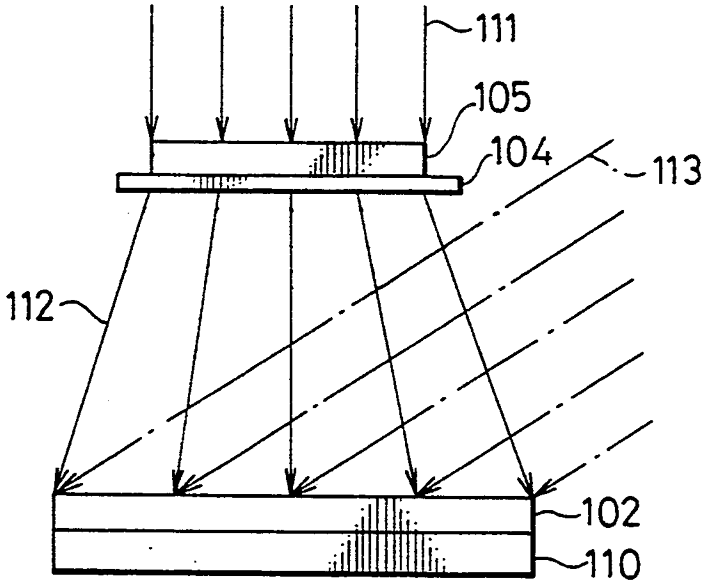
FIG. 17 illustrates an example of the process of making holograms according to Example 15.
Figure 18:
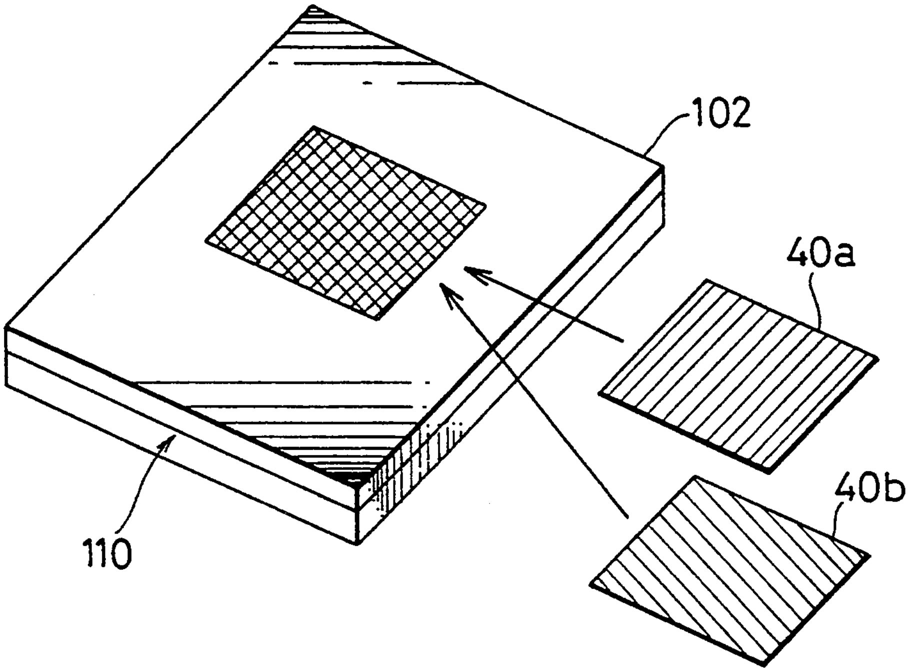
FIG. 18 is a schematic illustration of a master on which multiple recording has been made according to Example 15.

FIG. 17 illustrates an example of the manner by which a photograph for the monochromatic-light reproduction type hologram is taken using the transmission-type originals. As shown in this drawing, a transmission-type original 104 of the divided image (A) comprised of a letter "O" and a diffusion plate 105 are superposingly disposed at the upper part side, and a support 110 coated with a photosensitive material 102 is disposed at the lower part side. Incident light 111 made incident from the upper part of the diffusion plate 105 is diffused at the diffusion plate 105 and selectively passes through the transmission-type original 104. The light having passed through the transmission-type original 104 is called object light 112. The object light 112 interferes with reference light 113 shed at twelve o'clock as viewed from the upper part of the support 110 and diagonally from the upper part as viewed from the side, and records interference fringes on the photosensitive material 102. This first-exposure time is set to be about 3 seconds.

Next, the original is replaced with a transmission-type original 104 of the divided image (B) comprised of a letter "K", and also the support 110 coated with the photosensitive material 102 is rotated by 90° around the center of the surface of the support. At the same time, like the first exposure, the object light 112 and the reference light 113 are shed for, e.g., 4 seconds to multi-record interference fringes 40*a* and interference fringes 40*b* on the photosensitive material 102, the former corresponding to the letter "O" formed in the first exposure and the latter corresponding to the letter "K" whose directionality is different by 90°. The angel at which the support is rotated is not necessarily be 90°, and the support may also be rotated at other angles as a matter of course. Alternatively, in place of the method in which the support is rotated, the reference light 113 in the second exposure may be made incident at three o'clock as viewed from the upper part of the support 110 and diagonally from the upper part as viewed from the side. In the present Example, the divided image (A) comprised of a letter "O" and the divided image (B) comprised of a letter "K" are multi-recorded, which, however, may be so changed that more divided images with mutually different directionalities are multi-recorded.

After such double exposure was applied, the photosensitive material 102 was developed to prepare a master having the multi-recorded two hologram patterns.

A card (an image-recorded article) produced using the intermediate transfer medium according to the present Example was viewed with the naked eye under white light to find that, like the card (the image-recorded article) according to Example 14, a white-light reproduction type hologram and the image pattern 2*a* comprised of a portrait photograph were recognizable, but the hologram recorded area 400 was only recognizable as a mere pattern with an iris color.

Figure 19:
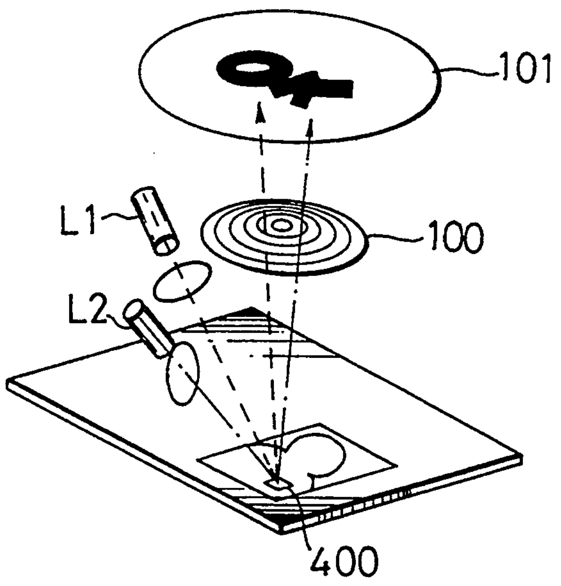
FIG. 19 illustrates a manner by which a hologram information according to Example 15 is read.

The card (the image-recorded article) was set on a given position of a machine reading unit and, as shown in FIG. 19, the hologram recorded area 400 was irradiated with visible light laser beams of 670 nm using two visible light laser beam source L1 and L2 from the respective directions corresponding to the directionalities of interference fringes of the hologram pattern, so that the hologram information comprised of letters "OK" formed by the synthesis of two hologram patterns was projected on a screen 101 made of ground glass, and thus it was possible to perform machine recognition on whether or not the card (the image-recorded article) was proper.

It was attempted to make a dead copy by making laser light incident at one direction on the hologram recorded area 400 of the card (the image-recorded article) according to the present Example. As a result, only part of the information pattern comprised of the letters "OK" was reproducible. Hence, it was difficult to forge or falsify the card.

EXAMPLE 16

Preparation of intermediate transfer medium:

—Composition of release layer coating material—The same composition as the release layer coating material in Example 1.

—Composition of hologram forming layer coating material—The same composition as the hologram forming layer coating material in Example 1.

—Composition of image-receiving adhesive layer coating material—The same composition as the image-receiving adhesive layer coating material in Example 1.

To the surface of a base sheet comprised of a 12 μm thick biaxially oriented polyethylene naphthalate film (trade name: TEONEX; available from Teijin Limited; degree of polymerization: 79 to 87), the release layer coating material was applied using a gravure coater so as to be in a dried coating weight of 2.0 g/m , followed by drying to form a release layer. To the surface of this layer, the hologram forming layer coating material was applied using a gravure coater so as to be in a dried coating weight of 1.0 g/$m^2$, followed by drying to form a hologram forming layer. After aging at 50° C. for 72 hours, the hologram forming layer and a hologram pattern forming surface of a hologram stamper (not shown) were put together using a pressing machine to carry out embossing under heating and pressing conditions of 150° C. and 40 kg/cm to form a land-and-groove pattern on the hologram forming layer.

Next, on the surface of the hologram forming layer provided with the land-and-groove pattern, ZnS was vacuum-deposited in a thickness of about 500 Å to form a transparent thin-film layer. Subsequently, the above image-receiving adhesive layer coating material was applied using a gravure coater so as to be in a dried coating weight of 1.5 g/$m^2$, followed by drying to form an image-receiving adhesive layer. Thus, an intermediate transfer medium was prepared.

Using the intermediate transfer medium thus obtained, a card (an image-recorded article) was produced in the same manner as in Example 1.

In the present Example, it was also ascertained that, since the polyethylene naphthalate film having a superior thermal stability was used as the heat-resistant base sheet, the image-receiving adhesive layer transferred to the card material (the transfer substrate) had a good appearance, i.e., the image pattern had a good quality, and also had so good an adhesion to the card material (the transfer substrate) that it was hardly separable therefrom.

EXAMPLE 17

Preparation of intermediate transfer medium:

—Composition of release layer coating material—The same composition as the release layer coating material in Example 3.

—Composition of hologram forming layer coating material—The same composition as the hologram forming layer coating material in Example 1.

| Composition of image-receiving adhesive layer coating material | |
|---|---|
| Linear saturated polyester resin (Tg: 85° C.) (trade name: BYRON 200; available from Toyobo Co., Ltd.) | 8.5 parts |
| Linear saturated polyester resin (Tg: 7° C.) (trade name: BYRON 200; available from Toyobo Co., | 1.5 parts |

-continued

| | |
|---|---|
| Ltd.) | |
| Melamine-formaldehyde condensate (decomposition point: 300° C.; softening point: none) (trade name: EPOSTAR S; available from Nippon Shokubai Kagaku Kogyo Co., Ltd.) | 2 parts |
| 2-(2'-Hydroxy-5'-methylphenyl)-benzotriazole | 2.5 parts |
| Toluene/2-butanone (2/1) | 40 parts |
| Composition of back coat layer | |
| Nitrocellulose (trade name: CEL-LINE; available from Daicel Chemical Industries, Ltd.) | 10 parts |
| Silicone oil | 1 part |
| 2-Butanone | 40 parts |

Figure 20:
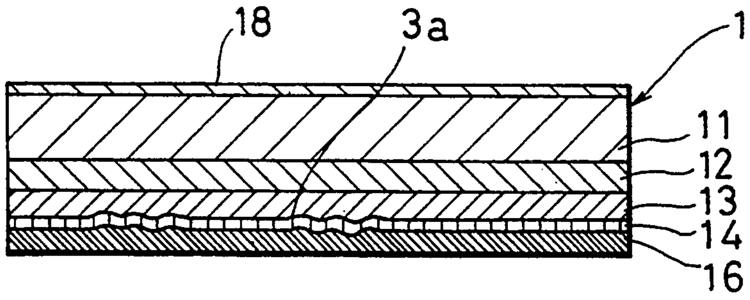
FIG. 20 is a cross-sectional illustration of an intermediate transfer medium according to Example 17.

To the surface of a 12 μm thick polyethylene terephthalate film, the above release layer coating material was applied using a gravure coater so as to be in a dried coating thickness of 2.0 μm, followed by drying to form a release layer 12. To the surface of this layer, the above hologram forming layer coating material was applied using a gravure coater so as to be in a dried coating thickness of 1.2 μm, followed by drying to form a hologram forming layer 13. After aging at 60° C. for 72 hours, the hologram forming layer and a hologram pattern forming surface of a hologram stamper were put together using a pressing machine to carry out embossing under heating and pressing conditions of 160° C. and 40 kg/cm to form a land-and-groove pattern *3a* on the hologram forming layer 13. Next, on the surface of the hologram forming layer 13, ZnS was vacuum-deposited in a thickness of about 500 Å to form a transparent thin-film layer 14. Subsequently, the above image-receiving adhesive layer coating material was applied using a gravure coater so as to be in a dried coating thickness of 1.5 μm, followed by drying to form an image-receiving adhesive layer 16. On other side of the polyethylene terephthalate film, the above back coat layer coating material was applied using a gravure coater so as to be in a dried coating thickness of 1.0 μm, followed by drying to form a back coat layer 18. Thus, an intermediate transfer medium 1 was prepared (see FIG. 20).

Using the intermediate transfer medium 1 thus obtained, a card (an image-recorded article) was produced in the same manner as in Example 1.

Adhesion, scratch resistance, wear resistance, plasticizer resistance, solvent resistance, heat resistance, forgery preventive performance and light-resistance of the cards (the image-recorded articles) thus obtained were each measured to ascertain that it showed the same properties as the card (the image-recorded article) in Example 1.

Anti-blocing performance of the intermediate transfer medium according to the present Example was also examined to find that it was superior to the intermediate transfer mediums according to other Examples.

To examine the anti-blocing performance, the intermediate transfer medium was stored for 48 hours in a rolled state in an environment of 50° C. and 90%RH to observe whether or not any blocing occurred.

What is claimed is:

1. An intermediate transfer medium comprising a heat-resistant base sheet and provided thereon a release layer and an image-receiving adhesive layer on which an image pattern is formed by a sublimation transfer means in accordance with image data, said image-receiving adhesive layer, on which said image pattern has been formed, being transferred to a transfer substrate together with said release layer to produce an image-recorded article, wherein;

said image-receiving adhesive layer is comprised of a thermoplastic resin having a glass transition point of from 50° C. to 150° C. and a filler added to the thermoplastic resin and selected from the group consisting of an inorganic filler having a melting point of 200° C. or above and an organic filler having a softening point or decomposition point of 200° C. or above.

2. The intermediate transfer medium according to claim 1, wherein, between said release layer and said image-receiving adhesive layer, a hologram forming layer having a land-and-groove pattern that constitutes a white-light reproduction type hologram and a transparent thin-film layer having a larger refractive index than said hologram forming layer are further provided in this order from the release layer side.

3. The intermediate transfer medium according to claim 1, wherein a lathe work printed layer or an information pattern printed layer is provided between said release layer and said image-receiving adhesive layer.

4. The intermediate transfer medium according to claim 2, wherein a lathe work printed layer or an information pattern printed layer is provided between said release layer and said hologram forming layer, between said hologram forming layer and said transparent thin-film layer, or between said transparent thin-film layer and said image-receiving adhesive layer.

5. The intermediate transfer medium according to claim 3, wherein said lathe work printed layer or said information pattern printed layer is formed of a fluorescent ink, an infrared ray absorbing ink or a magnetic ink.

6. The intermediate transfer medium according to claim 4, wherein said lathe work printed layer or said information pattern printed layer is formed of a fluorescent ink, an infrared ray absorbing ink or a magnetic ink.

7. The intermediate transfer medium according to claim 2, wherein said hologram forming layer is provided at some part thereof with a diffraction grating area feasible for optical machine reading.

8. The intermediate transfer medium according to claim 2, wherein said hologram forming layer is provided at some part thereof with a monochromatic-light reproduction hologram recorded area capable of reproducing a hologram pattern upon irradiation with monochromatic light, a plurality of hologram patterns whose interference fringes have directionalities different from one another being multi-recorded in said hologram recorded area, and the respective hologram patterns being simultaneously reproduced to make up one information pattern.

9. The intermediate transfer medium according to claim 2, wherein said hologram forming layer is provided at some part thereof with a monochromatic-light reproduction hologram recorded area capable of reproducing a hologram pattern upon irradiation with monochromatic light; said hologram recorded area being divided into a plurality of regions, a plurality of hologram patterns whose interference fringes have directionalities different from one another being separately recorded in the divided regions of said hologram recorded area, and the respective hologram patterns being simultaneously reproduced to make up one information pattern.

10. The intermediate transfer medium according to claim 1, wherein said heat-resistant base sheet is comprised of a biaxially oriented film comprising a polyethylene naphthalate represented by the formula:

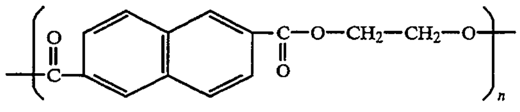

wherein n is 60 to 110.

11. The intermediate transfer medium according to claim 1, wherein said heat-resistant base sheet is provided on the back thereof with a back coat layer capable of preventing said heat-resistant base sheet and said image-receiving adhesive layer from blocking each other.

12. A process for producing an image-recorded article, comprising the steps of;

forming on an image-receiving adhesive layer of an intermediate transfer medium a multi-level image pattern formed of a sublimation ink and a binary image pattern formed of a coloring heat-melting ink and feasible for optical machine reading, by means of a thermal head by the use of a transfer ribbon alternately repeatedly provided with heat-sublimation ink layers and coloring heat-melting ink layers; said intermediate transfer medium comprising a heat-resistant base sheet and provided thereon i) a release layer and ii) an image-receiving adhesive layer comprised of a thermoplastic resin having a glass transition point of from 50° C. to 150° C. and a filler added to the thermoplastic resin and selected from an inorganic filler having a melting point of 200° C. or above and an organic filler having a softening point or decomposition point of 200° C. or above; and thermally transferring to a transfer substrate the image-receiving adhesive layer on which each image pattern has been formed, together with said release layer.

13. A process for producing an image-recorded article, comprising the steps of;

forming on an image-receiving adhesive layer of an intermediate transfer medium a multi-level image pattern formed of a sublimation ink and a binary image pattern formed of a coloring heat-melting ink and feasible for optical machine reading, by means of a thermal head by the use of a transfer ribbon alternately repeatedly provided with heat-sublimation ink layers and coloring heat-melting ink layers; said intermediate transfer medium comprising a heat-resistant base sheet and provided thereon i) a release layer, ii) a hologram forming layer, iii) a transparent thin-film layer and iv) an image-receiving adhesive layer comprised of a thermoplastic resin having a glass transition point of from 50° C. to 150° C. and a filler added to the thermoplastic resin and selected from an inorganic filler having a melting point of 200° C. or above and an organic filler having a softening point or decomposition point of 200° C. or above,; and thermally transferring to a transfer substrate the image-receiving adhesive layer on which each image pattern has been formed, together with said release layer, said hologram forming layer and said transparent thin-film layer.

14. The process for producing an image-recorded article according to claim 12, wherein said coloring heat-melting ink contains an infrared ray absorbing substance having a color similar to that of said transfer substrate.

15. The process for producing an image-recorded article according to claim 13, wherein said coloring heat-melting ink contains an infrared ray absorbing substance having a color similar to that of said transfer substrate.

* * * * *